(12) United States Patent
Chong

(10) Patent No.: US 11,826,646 B2
(45) Date of Patent: Nov. 28, 2023

(54) SYSTEM AND METHOD FOR PROVIDING ONE OR MORE SERVICES USING AN AUGMENTED REALITY DISPLAY

(71) Applicant: Skala FinTech Company Limited, Hong Kong (HK)

(72) Inventor: Yan Tat Chong, Quarry Bay (HK)

(73) Assignee: Skala FinTech Company Limited

( * ) Notice: Subject to any disclaimer, the term of this patent is extended or adjusted under 35 U.S.C. 154(b) by 462 days.

(21) Appl. No.: 17/270,094

(22) PCT Filed: Aug. 28, 2019

(86) PCT No.: PCT/CN2019/103054
§ 371 (c)(1),
(2) Date: Feb. 22, 2021

(87) PCT Pub. No.: WO2020/043130
PCT Pub. Date: Mar. 5, 2020

(65) Prior Publication Data
US 2021/0322877 A1    Oct. 21, 2021

(30) Foreign Application Priority Data

Aug. 29, 2018    (HK) .................................. 18111136.2

(51) Int. Cl.
*A63F 13/537*    (2014.01)
*G06F 16/245*    (2019.01)
(Continued)

(52) U.S. Cl.
CPC .......... *A63F 13/537* (2014.09); *G06F 16/245* (2019.01); *G06Q 40/08* (2013.01);
(Continued)

(58) Field of Classification Search
None
See application file for complete search history.

(56) References Cited

U.S. PATENT DOCUMENTS 11,532,051 B1 * 12/2022 Braun .................... G06Q 40/08
2018/0150899 A1 * 5/2018 Waldron ................ G06F 3/017
(Continued)

FOREIGN PATENT DOCUMENTS

CN    106807090 X    6/2017
WO    2013006642    1/2013
(Continued)

*Primary Examiner* — Ronald Laneau
(74) *Attorney, Agent, or Firm* — Renner, Kenner, Greive, Bobak, Taylor & Weber

(57) ABSTRACT

A method for providing insurance services to one or more users via a user device, the method including the steps of receiving a plurality of images or a video stream of an environment, overlaying an augmented reality display over the plurality of images or the video stream, presenting the augmented reality display to a user on the user device, identifying one or more risks within the plurality of images or the video stream, presenting the one or more risks to the user on the augmented reality display, determining one or more services to address the one or more identified risks, presenting the one or more services to the user on the augmented reality display, wherein the one or more services being selectable by a user via the augmented reality display.

29 Claims, 19 Drawing Sheets

(51) Int. Cl.
  *G06Q 40/08* (2012.01)
  *G06T 19/00* (2011.01)
  *G06V 20/40* (2022.01)
  *G06V 20/64* (2022.01)
  *G06Q 20/32* (2012.01)

(52) U.S. Cl.
  CPC ............ *G06T 19/006* (2013.01); *G06V 20/46* (2022.01); *G06V 20/64* (2022.01); *A63F 2300/8082* (2013.01); *G06Q 20/321* (2020.05); *G06Q 20/3223* (2013.01)

(56) References Cited

U.S. PATENT DOCUMENTS

2019/0228450 A1* 7/2019 Waldron ............ G06Q 30/0623
2022/0292220 A1* 9/2022 Groth ....................... G06F 21/16

FOREIGN PATENT DOCUMENTS

WO    2016164697    10/2016
WO    2017023540    2/2017

* cited by examiner

SYSTEM AND METHOD FOR PROVIDING ONE OR MORE SERVICES USING AN AUGMENTED REALITY DISPLAY

TECHNICAL FIELD

The present invention relates generally relates to a system for providing one or more goods and/or services using an augmented reality display, in particular but not limited to a system for providing insurance services using an augmented reality display.

BACKGROUND

There are a number of various business models for the provision of various services to users e.g. professional services, insurance services, real estate services etc. Insurance services are one very commonly provided service to a number of different users. Various types of insurance services are provided. Some commonly provided insurances are vehicle insurance, home insurance, contents insurance, health insurance and life insurance. These types of insurance services are utilized by a large proportion of the population in several nations.

Traditionally, insurance companies need data provided by their customers to calculate a risk associated with the customer and/or the items being insured. Insurance companies utilize the calculated risk to provide a quote to their customer and also consider if a requested insurance service can be offered to the customer. Some issues faced by insurance service providers are a) the data that is provided by their customers is provided on a good faith basis; b) the data collected from customers is generally timed at a single interval i.e. the data is collected only provide a snapshot at a single time instance, whereas risk levels can change. Customers generally do not provide continuous information to insurance service providers to address the changing risk; c) customers interests are not aligned with the insurance providers i.e. customers generally do not value or care about reducing the risk of the insurance provider as long the customer is insured.

SUMMARY OF THE INVENTION

The present disclosure generally relates to a system and a method for providing insurance services to customers i.e. users. In particular the present disclosure comprises a risk management platform that connects insurance service providers with customers as well as with risk practitioners e.g. risk advisors, loss adjusters etc. via the internet or a communications network.

In once aspect, the present invention is broadly directed to a method for providing insurance services to one or more users via a user device, the method comprising the steps of:
receiving a plurality of images or a video stream of an environment, overlaying an augmented reality display over the plurality of images or the video stream,
presenting the augmented reality display to a user on the user device,
identifying one or more risks within the plurality of images or the video stream,
presenting the one or more risks to the user on the augmented reality display,
determining one or more services to address the one or more identified risks,
presenting the one or more services to the user on the augmented reality display, wherein the one or more services being selectable by a user via the augmented reality display.

In an embodiment the one or more risks correspond to an object or a person identified within the one or more images or video stream.

In an embodiment the step of identifying one or more risks comprises the steps of identifying one or more objects within the environment and determining one or more risks associated with the one or more identified objects.

In an embodiment the step of identifying one or more objects within the environment comprises the additional steps of:
scanning each of the one or more images or each frame in the video stream,
applying a feature detection protocol to each image or each frame of the video stream to identify a plurality of features, processing the identified features to determine an object.

In an embodiment the step of processing the identified features comprises looking up an object database with the identified features and identifying an object that corresponds to the identified features.

In an embodiment the step of identifying one or more objects comprises:
receiving a object identifier from a device wherein the object identifier being unique to each object,
determining an object based on the received object identifier by comparing the identifier with a stored list of identifiers wherein the list stores a relationship between an identifier and a corresponding object.

In an embodiment the method comprises providing an interrogation signal to the electronic device, receiving the object identifier as an electronic signal from the electronic device in response to the interrogation signal.

In an embodiment the step of determining one or more risks comprises the additional steps of checking a risk processing unit or a risk database or a risk practitioner device to identify known risks associated with the detected object.

In an embodiment the one or more risks associated with the detected object is displayed on the augmented reality display, the one or more risks being displayed as a list adjacent the object.

In an embodiment the method comprises the additional step of categorizing the identified risks based on severity.

In an embodiment the risk processing unit or the risk database or the risk practitioner device includes information regarding one or more known risks associated with each object and each risk being classified based on severity of the risk.

In an embodiment the method comprises the additional steps of: generating one or more icons or multimedia images positioning the one or more icons or multimedia images onto the augmented reality display, such that the one or more icons or multimedia images are overlaid onto the image or video stream, wherein each of the one or more icons or multimedia images corresponding to and representing each identified risk.

In an embodiment each identified risk is represented by a unique icon or multimedia image.

In an embodiment each icon or multimedia image is interactable by a user.

In an embodiment the method comprises presenting an option to remove the icon or multimedia image, the option being presented adjacent the risk on the augmented reality display and the option is selectable by the user.

In an embodiment the method comprises the additional step of presenting the list of one or more services to address the identified risk when the option is interacted with, the services being presented on the augmented reality display.

In an embodiment the one or more services are insurance services or insurance coverage to cover the identified object.

In an embodiment the method comprises the additional steps of:
tracking user activities,
maintaining a record of activities completed by the user assigning a user with points or one or more tokens based on the activities completed by the user, wherein a predetermined amount of points or tokens is assigned to the user and;
storing the points or tokens assigned to the user.

In an embodiment the method as described is implemented as an interactive game such that insurance services are presented to the user as part of an interactive game.

In an embodiment the interactive game is a game that is played by the user on the user device using the augmented reality device.

In another aspect the present invention is broadly directed to a method of providing insurance services to one or more users comprising:
receiving one or more images or a video stream of an environment,
applying a feature detection protocol to each image or frame of the video stream,
processing the identified features to determine an object,
determining one or more risks associated with each object,
transmitting the identified risks such that the identified risks are presented to a user on a user device via an augmented reality display that is implemented on the user device.

In an embodiment the step of processing the identified features comprises looking up an object database with the identified features and identifying an object that corresponds to the identified features.

In an embodiment the step of determining the one or more risks comprises checking a risk database to identify known risks associated with the detected objects.

In an embodiment the one or more risks associated with the detected object is displayed on the augmented reality display.

In an embodiment the method comprises the additional steps of:
generating one or more icons or multimedia images positioning the one or more icons or multimedia images onto the augmented reality display, such that the one or more icons or multimedia images are overlaid onto the image or video stream,
wherein each of the one or more icons or multimedia images corresponding to and representing each identified risk such that each risk is represented by an icon or multimedia image on the augmented reality device.

In an embodiment the method comprises the additional steps of:
identifying one or more services to address the identified risks,
presenting the one or more services on an augmented reality display such that a user can select one of the one or more services, wherein
the services are one or more insurance services each of the insurance services are provided by one or more insurance service providers,
receiving a selection of at least of the services,
facilitating purchase of the selected service.

In an embodiment the one or more images are received from a user device, wherein the user device includes an image capture device that is configured to capture images or an environment at predetermined intervals.

In an embodiment the method comprises the additional steps of:
tracking user activities,
maintaining a record of activities completed by the user assigning a user with points or one or more tokens based on the activities completed by the user, wherein a predetermined amount of points or tokens is assigned to the user and;
storing the points or tokens assigned to the user.

In another aspect the present invention is directed to an interactive game for providing services to a user, the method comprising the steps of:
presenting one or more selectable user characters on an augmented reality display that is overlaid over an image or video stream of an environment,
identifying one or more objects within the environment,
identifying one or more risks associated with the identified objects,
presenting the identified risks on the augmented reality display wherein each risk is represented as an icon or a multimedia image,
presenting one or more options to attack the icon or multimedia image with the user character to remove the risk,
assigning a score for each risk that is removed and;
presenting the accumulated score on the augmented reality display.

In an embodiment the one or more options correspond to a selectable insurance service, the insurance service being a service that mitigates the risk.

In an embodiment user character is moveable on the augmented reality display.

In an embodiment the user character is customizable by the user.

In an embodiment each object is identified by applying a feature detection protocol to each received image or video frame from a user device or an image capture device associated with the user, the detected features being looked up in a look up table or an object database with the identified features to determine an object that corresponds to the identified features.

In an embodiment the method comprises the additional steps of receiving a selection of a service from the user device and providing the selected service to an insurance provider device, wherein the insurance provider device is the device that corresponds to an insurance provider that has offered the selected service.

In an embodiment the method further comprises executing an online purchase of the selected service.

In an embodiment the method comprises recording a score of the user wherein the score corresponds to the number of risks that are removed.

The term "comprising" as used in this specification and claims means "consisting at least in part of". When interpreting statements in this specification and claims which include the term "comprising", other features besides the features prefaced by this term in each statement can also be present. Related terms such as "comprise" and "comprised" are to be interpreted in a similar manner.

The term "user" or "person" refer to the same entity which is an individual who can interact with one or more components of the system for providing rewards. The user or person may also comprise a computing device associated with the user i.e. person, the user i.e. person configured to interact with the system via the computing device.

The term "fault" refers to a defect or weakness or imperfection or defect in a portion of the building e.g. a window that may compromise the structural integrity of the window or a defect or a weakness that may cause the window to break or collapse. The fault may relate to the window or the frame of the window. The fault may also refer to the orientation or positioning of the window within the frame or the orientation or position of the frame within a cavity in the building wall.

The term "image processing technique" means an image processing algorithm that can be executed by a hardware module such as a processor or a diagnostic unit as described herein.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed. A method (i.e. process) may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet or mobile device. The term "mobile device" includes, but is not limited to, a wireless device, a mobile phone, a smart phone, a mobile communication device, a user communication device, personal digital assistant, mobile hand-held computer, a laptop computer, an electronic book reader and reading devices capable of reading electronic contents and/or other types of mobile devices typically carried by individuals and/or having some form of communication capabilities (e.g., wireless, infrared, short-range radio, etc.) or wearable devices comprising a computer or computing device to allow the wearable devices to store and execute/process computer readable instructions.

BRIEF DESCRIPTION OF THE DRAWINGS

Exemplary embodiments of the invention will now be described by way of example only and with reference to the following figures, in which.

DETAILED DESCRIPTION OF THE PREFERRED EMBODIMENTS

The present disclosure generally relates to a system and a method for providing insurance services to customers i.e. users. In particular the present disclosure comprises a risk management platform that connects insurance service providers with customers as well as with risk practitioners e.g. risk advisors, loss adjusters etc. via the internet or a communications network.

The system for providing insurance services (i.e. the risk management platform) allows the insurance provider to easily gather information dynamically from the customer, thereby allowing the insurance provider to dynamically adjust the insurance risk. The system also provides a platform for the insurance provider continually communicate with and update the customer regarding any changes to their risk level. The system provides a platform that can allow an insurance service provider to recommend additional insurance services to customers via a customer device. The platform may be provided by a computing device or system such as for example a server that can communicate with computing devices associated with a number of parties such as users, insurance providers, risk assessors etc.

The present disclosure generally relates to a system for providing insurance services that leverages augmented reality (AR) and internet connectivity or customer devices (i.e. user devices) to collect important data for insurance services. The system also leverages internet connectivity of various devices i.e. internet connectivity technology to improve the interconnectivity of user devices and devices (e.g. computing devices) associated with insurance service providers. The interconnectivity improves data transfer between devices and improves communication between the various parties.

The system and method for providing insurance services, in particular using augmented reality with user devices increases and enhances engagement between the user and different service providers involved in insurance services and related services. The system is also advantageous since the use of augmented reality on user devices and the wireless connectivity of user devices with insurance service provider devices. The system for providing insurance services is advantageous since the system improves the efficiency of the insurance process. Further the system is advantageous since it helps to improve capturing additional data which in turn enables better and tailored risk calculations.

Figure 1:
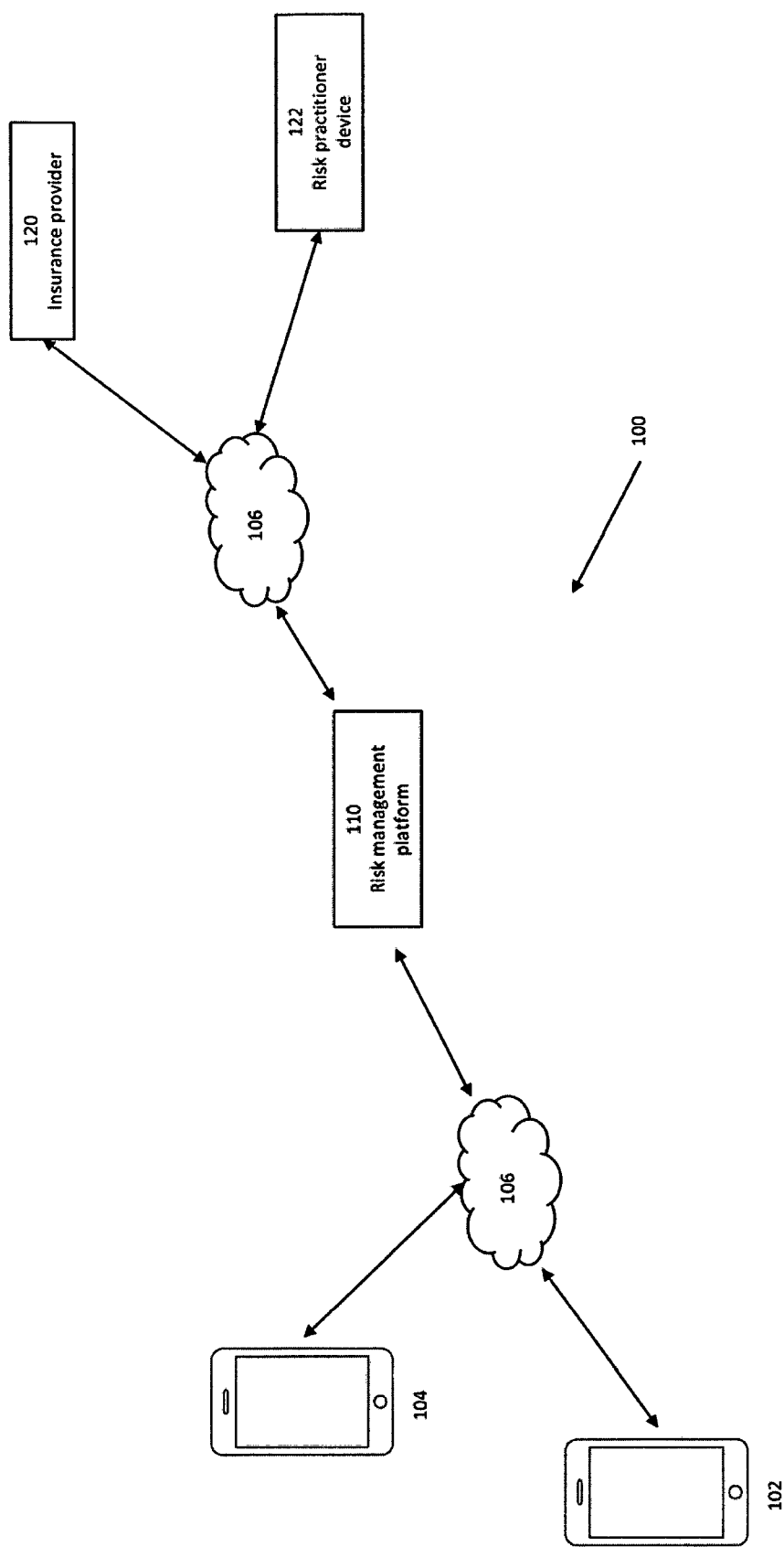
FIG. 1 shows a diagram a system for providing insurance services to one or more users.

FIG. 1 shows an example form of a system 100 for providing insurance services to one or more users. The system 100 is configured to provide insurance services via a wireless communication network 106. The system 100 also promotes improved data capture that can be used to provide tailored insurance services and/or improve risk assessment.

Referring to FIG. 1 the system 100 comprises a risk management platform 110 and one or more user devices arranged in electronic communication with the risk management platform 110. FIG. 1 shows two user devices 102, 104 that are arranged in electronic communication with the risk management platform 110 via a wireless communication network 106. The wireless communication network 106 can be any suitable communication network such as for example the internet, 3G network, 4G network, a cellular network or any other suitable communication network. Any suitable communication protocol and data transfer protocols may be used to transmit and receive information between the risk management platform 110 and the other devices in the system 100. For example, an HTTP or HTTPS protocol can be used for transferring data (e.g. files, images) from the platform 110 and the various devices.

The user devices 102, 104 are mobile devices that includes at least a processor and a memory unit. The user devices 102, 104 may comprise a smartphone or tablet or another suitable mobile device. The platform 110 comprises a computing device that includes at least a processor, a memory unit and a communication module.

The risk management platform 110 is further arranged to communicate with one or more insurance provider devices 120 and one or more risk practitioner devices 122. The insurance service provider device 120 and the risk practitioner device 122 are configured to wirelessly communicate with the platform 110 via a wireless communication network 106. The insurance service provider device 120 and risk practitioner device 122 preferably communicate with the platform 110 via network 106. Alternatively, the insurance provider device 120 and/or the risk practitioner device 122 are configured to communicate with the platform 110 via a different wireless communication network.

The risk management platform. 110 is arranged in a server client relationship with the user devices 102, 104. The platform 110 functions as a server and provides information to the user devices 102, 104. The platform 110 also allows information transfer from insurance service provider devices 120 and/or risk practitioner devices 122 to the user devices 102, 104. The platform 110 indirectly links the user devices 102, 104 with the other devices within the system and provides for efficient information transfer between the user devices 102, 104 and the other devices in the system 100.

The insurance provider device 120 is associated with an insurance provider. The insurance provider is a party that provides insurance services to a user. The insurance services may be any insurance services such as home insurance, contents insurance, landlord insurance, renter's insurance, natural disaster insurance, health insurance, pet insurance, travel insurance, vehicle insurance or any other insurance. The risk practitioner device is associated with any risk practitioner. The risk practitioner is a party that provides risk related services for insurance. The risk services may be risk assessment, identifying risks for various objects, or other risk relate services. The risk practitioners may be for example risk advisors, underwriters or loss adjusters.

The risk management platform 110 can function in a server client relationship with the insurance provider device (or devices) 120 and the risk practitioner device (or devices) 122. The risk management platform 110 functions to interconnect the various devices and facilitate data transfer between the various devices. The risk management platform 110 can function as a hub to control and direct data flow in order to provide online insurance services to users.

The risk management platform 110 is further configured to provide gamify the provision of insurance related services. The platform 110 is configured to communicate with each user device 102, 104 and provide data that allows a user to play one or more types of games. The platform. 110 is configured to provide insurance services to the user devices 102, 104 as part of a selected game, such that the user receives insurance services while playing the game. The insurance services may provided as an advertisement within the game. Preferably the insurance services are provided as elements of the game, such that the user is actively engaged with the game. The user can select one or more insurance services as part of the game. The user can also gain tokens or points for completing predefined tasks.

The platform 110 is configured to receive various insurance services from the one or more insurance providers. The platform 110 is configured to store the received insurance services in an insurance service database such that the services are readily accessible. The platform 110 is also configured to provide one or more of the various insurance services to the user devices. In at least one example the insurance services are provided as part of a game the user can play on the user device.

The user device 102, 104 is a mobile device such as a smartphone. The user device functions as a user interface and is configured to provide information to a user and receive inputs from the user. The user device 102, 104 is adapted for wireless communication with the risk management platform 110. The user device 102, 104 receives insurance services and presents the same to the user. The user can select one or more presented insurance services. The selected insurance services are provided to the corresponding insurance service provider devices 120 that are associated with the selected insurance services. The insurance service provider may process the order (i.e. the selected insurance service) and provide an insurance certificate to the user. The insurance certificate may be provided to the user device or alternatively may be sent by mail or courier or may be emailed.

The user device 102, 104 is further configured to present an augmented reality display to the user. The augmented reality display is overlayed over one or more images or a video stream of the environment, the images or video being captured by an image capture device of the user device. The augmented reality display allows various information such as for example text, images, icons etc. The augmented reality display provides an effective manner of communicating information to a user. The augmented reality display is consistently updated.

In one form the risk management platform is configured to receive a plurality of images or a video stream of an environment. The user device 102, 104 or the risk management platform 110 is configured to generate and overlay an augmented reality display over the plurality of images or the video stream. The augmented reality display is presented to a user on the user device 102, 104. The risk management platform 110 is configured to identify one or more risks within the plurality of images or the video stream. The identified risks are provided to the user devices 102, 104. The user device 102, 104 is configured to present the one or more risks to the user on the augmented reality display. The platform 110 is configured to determine one or more services to address the one or more identified risks. The platform 110 is configured to provide the services to the user devices 102, 104. The user device 102, 104 is configured to present the one or more services to the user on the augmented reality display, wherein the one or more services being selectable by a user via the augmented reality display. The selected services are processed by the platform 110. In this example the one or more risks are insurance related risks and the one or more services are insurance services. The platform 110 is configured to communicate with the insurance service provider 120 and the risk practitioner 122 in order to communicate the identified risks. Further the platform 110 is configured to communicate the selected services to the insurance provider 120 and organize a purchase of the insurance services.

The platform 110 comprises a computing device e.g. a server. The server comprises at least a hardware processor unit and a memory unit. The processor unit and memory unit being in electronic communication with each other. In one example embodiment the server 110 is implemented by a computer having an appropriate interface. The computer may be implemented by a suitable computing architecture. In one example the platform 110 is implemented in a stand-alone PC. Preferably the platform 110 may be implemented as part of a cloud computing architecture. In a cloud computing architecture, the platform may be implemented across a plurality of shared computing resources e.g. a plurality of servers. The cloud computing architecture may be provided by a separate cloud computing provider. The platform 110 may be implemented in any suitable service model.

In a further alternative configuration, the platform 110 may be implemented as a further client/server architecture or computing device, or a terminal/mainframe architecture or any other appropriate architecture. In another alternative configuration the risk management platform 110 and its components described herein may be implemented as a microprocessor or a microcontroller on a mobile computing device such as for example a tablet or smartphone or laptop. In this alternative configuration the risk management platform 110 is constructed as a compact unit that may be implanted in the user device 102, 104 such that each user device can independently function as a risk management platform and communicate with the risk practitioner devices 122 and/or the insurance provider devices 120.

Figure 2:
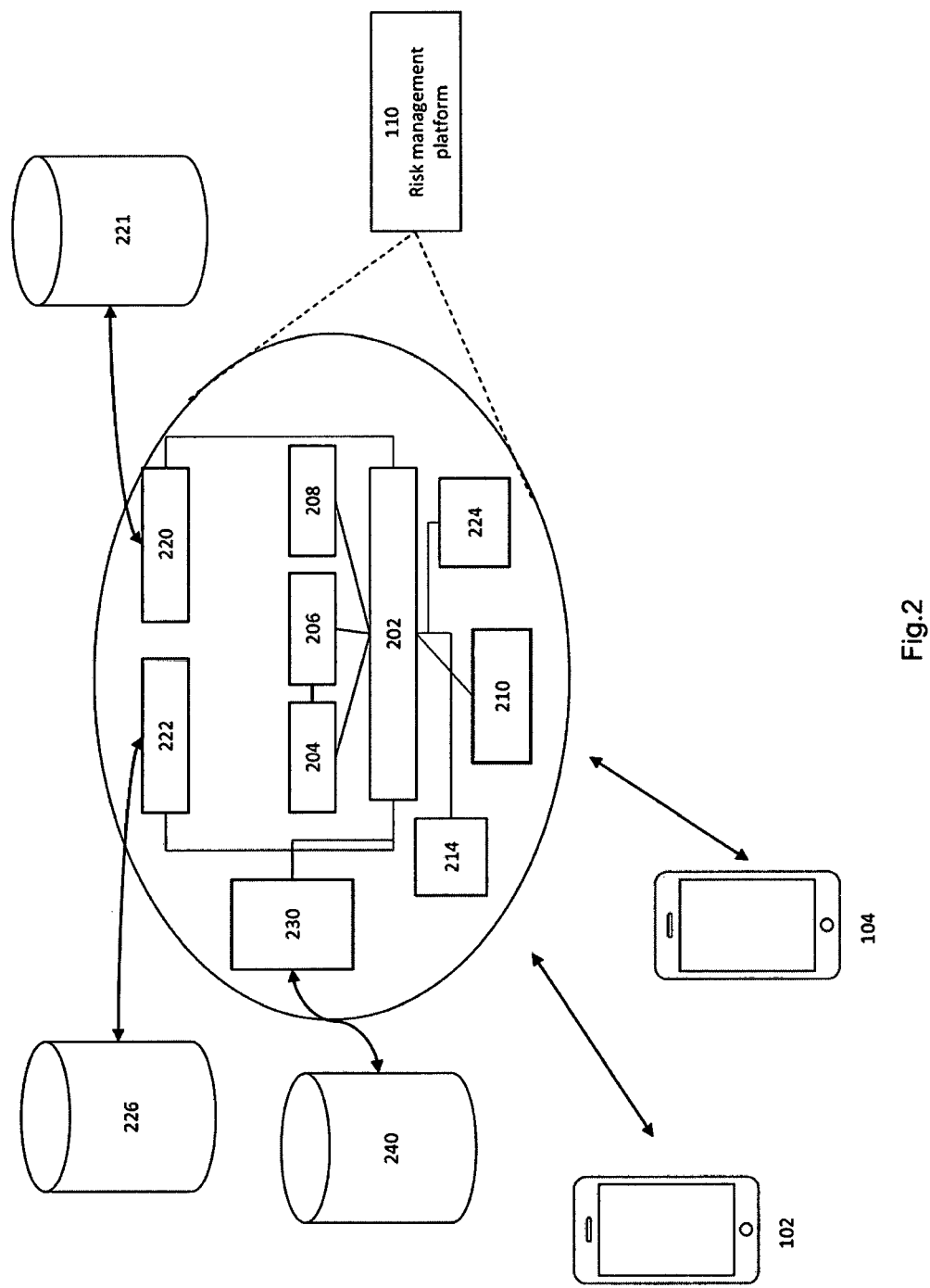
FIG. 2 shows a schematic diagram of the risk management platform of FIG. 1 and its components.

FIG. 2 shows an example configuration of the platform 110 that is a server and is implemented as a stand-alone PC. Referring to FIG. 2 there is a shown a schematic diagram of the risk management platform 110 which in this embodiment comprises a server 110. The server 110 comprises suitable components necessary to receive, store and execute appropriate computer instructions. The components may include a processor unit 202, read-only memory (ROM) 204, random access memory (RAM) 206, and input/output devices such as disk drives 208, input devices 210 such as an Ethernet port, a USB port, etc. The platform 110 comprises a communications unit 214. The communication unit 214 is electrically coupled to the processor unit 202, and is configured to facilitate connection to a communication network 106. The communication unit 214 allows the platform 110 to communicate with the user device, supplier devices, independent tester devices and other devices. The 202 communication unit 214 can connect to an external communication network (e.g. communication network 106) or an external computing network through a telephone line or another type of communication link.

In an alternative configuration there may be provided a plurality of communication units 214 which may variously connect to one or more computing devices such as a server, personal computers, terminals, wireless or handheld computing devices. At least one of a plurality of communications units may be connected to an external computing network through a telephone line or other type of communications link.

The platform 110 includes instructions that may be included in ROM 204, RAM 206 or disk drives 208 and may be executed by the processor unit 202. The platform 110 (i.e. server 110) may include storage devices such as a disk drive 208 which may encompass solid state drives, hard disk drives, optical drives or magnetic tape drives. The server 110 may use a single disk drive or multiple disk drives. The server 110 may also have a suitable operating system 216 which resides on the disk drive or in the ROM of the server 110 (i.e. platform).

The risk management platform 110 comprises an object detection module 220. The objection module may be implemented as a hardware unit that is arranged in electronic communication with the processor and/or one or more of the memory units. The object detection module may be implemented as a microprocessor, integrated circuit, FPGA, ASIC or any other suitable hardware unit. In one example configuration the objection detection module 220 may be implemented as an independent processing unit.

The object detection module 220 is configured to identify one or more objects within an environment. The object detection module 220 is configured to identify one or more objects from one or more images or a video stream of an environment. The object detection module 220 may include an object database 221 that stores a relationship between a plurality of features and objects. The object database relates physical features with an object. The object detection module 220 is configured to apply a feature detection protocol that identifies a plurality of features. The feature detection protocol is configured to identify any one or more of colours, edges, shapes, corners, contrast or any other suitable features. The object detection module 220 may include a suitable one or more feature detection programs such as for example any one or more of a SUSAN corner detector, AST feature detectors, Gaussian detector or any suitable feature detectors. The feature detection program may be a one or more software programs that can be executed by the object detection module 220 in order to detect one or more features that can be used to determine an object.

In an alternative configuration the object detection module 220 may be implemented as a software module that is stored within a memory unit. The software module includes instructions that can be executed by the processor 202.

The object may be any device or product. In one example the object is an electronic device e.g. a computer. In another example the object may be products or devices within an environment. The device or product may include electronic components that allow communication between the user device 102, 104 and object as well as the object and the risk management platform 110. In another example the object may be a person or animal.

The platform 110 further comprises an additional risk processing unit 222. The risk processing unit 222 is implemented as a hardware module, such as for example a microprocessor or an integrated circuit or an ASIC or an FPGA device or any suitable hardware processor unit. The risk processing unit 222 may be an independent processor. The risk processing unit 222 is arranged in electronic communication with the processor 202 and one or more of the memory units. The risk processing unit 222 is configured to receive electronic information related to detected objects within an environment and determine one or more risks associated with the detected objects. The risk processing unit is also configured to communicate with the risk practitioner device 122. The risk processing unit 222 is configured to check the risk practitioner device 122 to identify known risks associated with a detected object. The object is detected from the object detection module 220. Optionally the risk processing unit 222 may include a risk database 226. The risk database 226 stores a relationship between an object and its associated risks. The risk database 226 may be constantly updated by updated risk information from the risk practitioner device 122. The risk database 226 being updated regularly Alternatively, the risk processing unit may be implemented as a software module. The risk processing software module may be stored in a memory unit of the platform 110 and include instructions that cause a processor to determine or more risks associated with the detected objects.

The platform 110 further comprises a service provision module 224. The service provision module 224 is configured to determine one or more services to address the one or more identified risks. The service provision module 224 may be implemented as a hardware module such as for example a microprocessor or a processing unit or an FPGA unit or any suitable hardware module. The service provision module 224 is configured to communicate with the insurance provider devices 120 and/or risk practitioner device 122. The service provision module 224 is further configured to receive one or more services from the insurance provider devices and provide the services to the user device. In an alternate configuration the service provision module 224 may be implemented as a software module. The service provision software module may be stored in a memory unit of the platform 110 and include instructions that cause the processor 202 to determine one or more services to address the one or more identified risks. The services are insurance services that can be used to mitigate the risks associated with the object.

The platform 110 further comprises a game generation module 230. The game generation module 230 is configured to generate the game environment that can be generated and presented to the user on the user device. The game generation module 230 stores game related information that can be transmitted to the user device. The game related information includes data related to providing a game for providing insurance services using an augmented reality display. The game generation module 230 may be a hardware processor or may be a software program that is stored in one of the memory devices e.g. ROM 204.

The platform 110 also comprises a user database 240. The user database 240 is configured to store user data including user profiles. Each user profile includes at least the name of the user, address, user device identity information (e.g. IP address, model number). Each user signs up to the platform 110 via a login process. The login process comprises accessing the platform 110 from the user device and inputting a plurality of information points. The required information may be presented to the user as a series of questions. A user profile is created that includes the user information. The user profile is stored in the user database 240. As part of the login process, a game generation engine can be downloaded from the game generation module 230 and stored in the user device. The user data stored in each user profile may be transmitted to the insurance provider devices 120. The user data is preferably stored in a secure manner The platform 110 may also comprise additional hardware components e.g. microprocessors or integrated circuits or digital circuits to provide the functionality described herein. The platform 110 may also include additional software modules or software programs in order to provide the functionality described herein.

Figure 3:
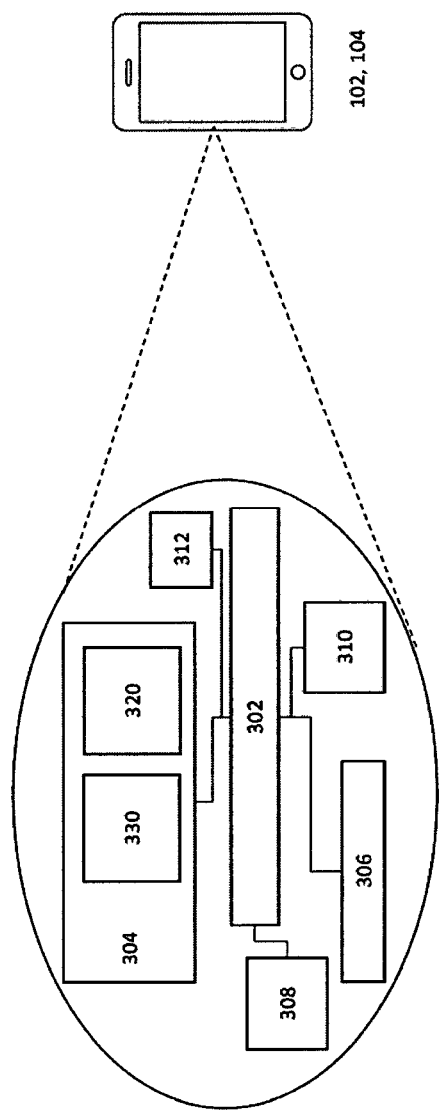
FIG. 3 shows a schematic diagram of the user device of FIG. 1 and its components.

FIG. 3 shows an example configuration of a user device. FIG. 3 shows a schematic diagram of the user device and its components. The user device (e.g. devices 102, 104) are a mobile device such as a tablet or a smartphone. The illustrated example shows the user device is a smartphone. The user device 102, 104 comprises a processor 302, a memory unit 304, a user interface 306 and an image capture device 308. The processor 302 is a hardware processor such as a microprocessor implemented in a chip. Alternatively, the processor 302 may be an FPGA or a microcontroller or any other suitable implementation. The memory unit 304 is in electronic communication with the processor 302. The memory unit 304 may be any suitable type of memory unit e.g. a read/write memory, a flash memory, a hard drive, magnetic tape or any other type of memory unit 304. The memory unit 304 can store various information and may also store various software applications or software modules.

The user interface may be any appropriate user interface 306 that allows information to be displayed to a user. The user interface 306 also allows a user to input information, wherein the information can be stored in the memory unit 304 and/or be processed by the processor 302. In one example the user interface 306 is a touch screen such as for example a capacitive touch screen. The image capture device 308 is a camera. The image capture device 308 is preferably a high level camera. The image capture device 308 is in electronic communication with the processor 302 and/or the memory unit 304.

The user device 102, 104 further comprises a communication module 310 and a GPS receiver 312. The communication module 310 allows the user device to interact with a wireless communication network, such as network 106. The communication module allows the user device 102, 104 to communicate with the platform 110 and/or the other devices such as for example the insurance provider device 120 and risk practitioner device 122.

The user device 102, 104 comprises an augmented reality module 320. The augmented reality module 320 is implemented as a software module that is stored in the memory unit 304 and is executable by the processor 302. The augmented reality module 320 may be part of a software application (app) that is stored in the memory unit 304. The app allows the user device 102, 104 to communicate with the platform 110. The app is downloaded from the platform 110 and causes the user device 102, 104 to function as a client in a server client relationship with the platform 110.

The augmented reality module 320 may be configured to output an augmented reality display. The augmented reality display is an augmented reality enhanced view that is presented on the user interface 306. The augmented reality module 320 is configured to receive a plurality of images or a video stream of an environment from an image capture device 308. The image capture device 308 may continuously capture a plurality of images or a video stream when the augmented reality module 320 is activated. The augmented reality module 320 is further configured to overlay an augmented reality display to a user on the user device i.e. on the user interface 306. The augmented reality display comprise an augmented reality enhanced view that is overlaid onto the images or video stream, on the user interface 306. The augmented reality display allows additional information to be overlaid onto the images or video stream in order to enhance the user experience and also present insurance service information live during use.

Alternatively, the augmented reality module 320 may be a separate hardware module that may be controlled by the processor.

The user device 102, 104 further comprises a game engine 330. The game engine 330 may be a software program that is stored in the memory unit 304 and executable by the processor 302. The game engine 330 is configured to generate and present gaming characters and create a game environment that is presented to the user on the augmented reality display. The game engine 330 may be downloaded from the platform 110 as part of a user registration process.

Figure 3A:
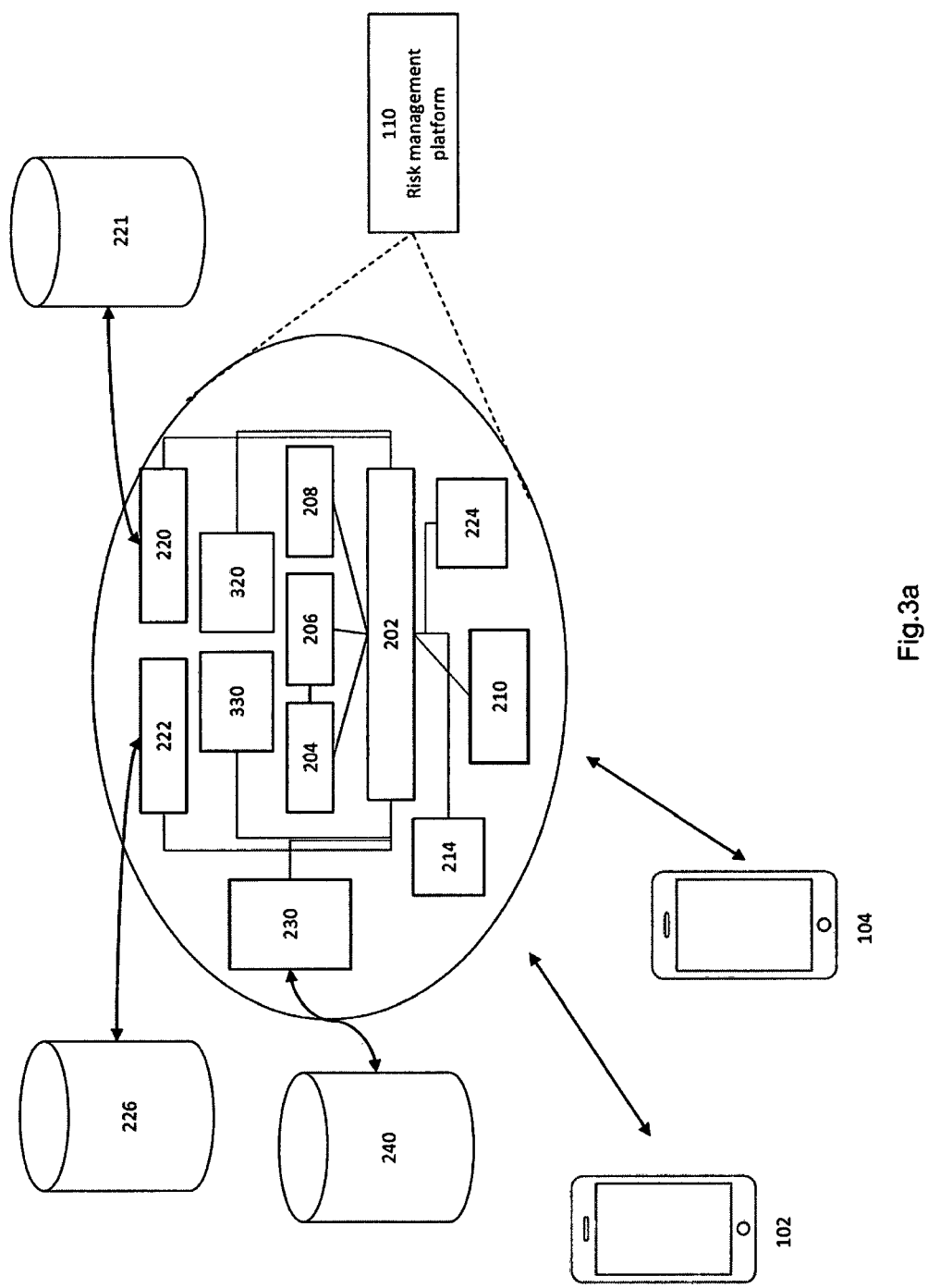
FIG. 3a shows an alternative configuration of the platform and its components.

In a further alternative configuration, the augmented reality module 320 may be integrated into and implemented as part of the risk management platform 110. FIG. 3a shows an alternative configuration of the platform 110 and its components. As shown in FIG. 3a the platform 110 comprises all the components are described with reference to FIG. 2. The platform 110 comprises at least a processor 202, a plurality of memory devices 204, 206, 208 and an input device 210. The platform 110 also includes a communications unit 214 configured to allow the platform 110 to wirelessly communicate with the various elements of the system 100. The platform 110 also comprises a object detection module 220, a risk processing unit 222, a service provision module 224 and the augmented reality module 320.

The augmented reality module 320 may be a software module that is saved in one of the memory units of the platform 110 e.g. ROM 204. The augmented reality module 320 is configured to receive one or more images or a video stream of an environment from the user device 102, 104. The user device captures the images or video stream from the image capture device 308. The images or video stream are transmitted to the platform 110. The augmented reality module 320 within the platform 110 is configured to process the images or video stream and overlay an augmented reality display. The augmented reality display overlaid on the images or video stream is transmitted back to the user device to be presented to the user on the user interface 306. In this alternative configuration the platform 110 is configured to overlay various information as part of the augmented reality device.

Figure 4:
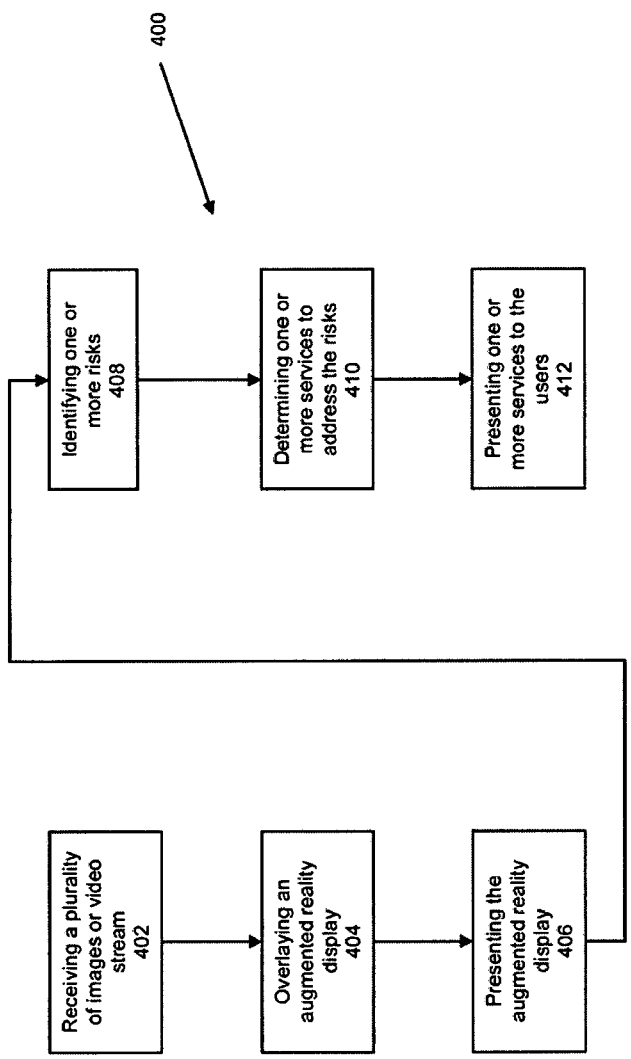
FIG. 4 illustrates a method for providing insurance services to one or more users via a user device.

FIG. 4 illustrates a method for providing insurance services to one or more users via a user device. The method 400 commences at step 402. The step 402 comprises receiving a plurality of images or a video stream of an environment. Step 404 comprises overlaying an augmented reality display over the plurality of images or the video stream. Step 406 comprises presenting the augmented reality display to a user on the user device. Step 408 comprises identifying one or more risks to the user on the augmented reality display. Step 410 comprises determining one or more services to address the one or more identified risks. Step 412 comprises presenting the one or more services to the user via the augmented reality display, wherein the one or more services being selectable by a user via the augmented reality display. The one or more identified risks correspond to an object or device or person that is identified within the one or more images or the video stream. In one example the services are insurance services that can be provided by one or more insurance service providers. The insurance services are recommended to mitigate one or more of the identified risks. The insurance services may be recommended based on relevance to the one or more identified risks and the services may assist in protecting against any future damage due to the one or more identified risks.

The method 400 may be repeated at regular intervals. Alternatively, the method 400 may be constantly executed when an application on the user device is activated. The application may be a software application that includes instructions that facilitate connection and communication with the platform 110.

Figure 5:
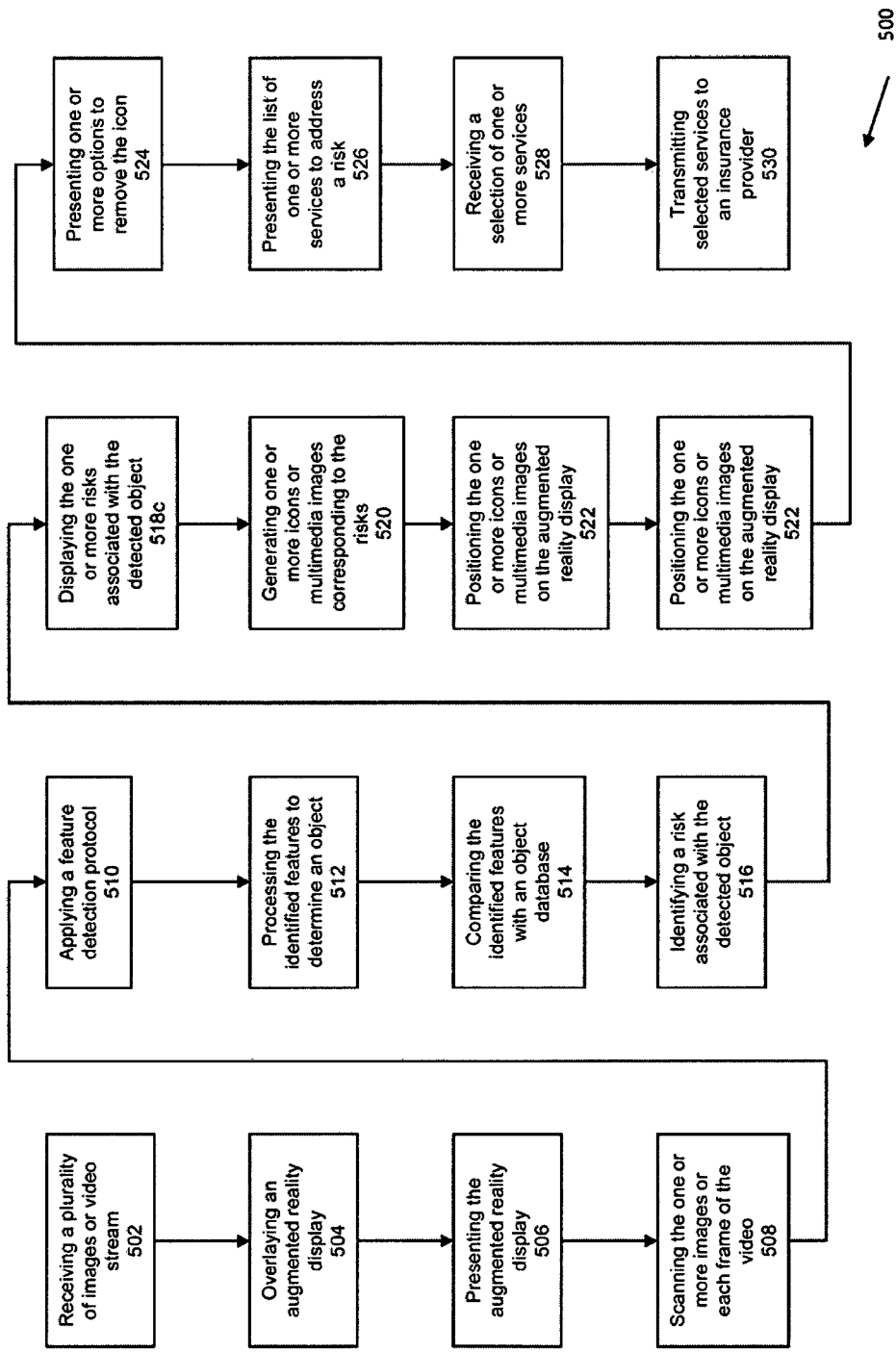
FIG. 5 shows a flow chart of a method for providing insurance services.

FIG. 5 shows another example method 500 of providing insurance services to a user via a user device. The method 500 commences at step 502. Step 502 comprises receiving a plurality of images or a video stream of an environment. The images or video stream is captured by an image capture device, such as for example the image capture device 308. The method progresses to step 504. Step 504 comprises overlaying an augmented reality display over the plurality of images or the video stream. The augmented reality display is generated by the augmented reality module 320. The augmented reality module 320 is configured to generate an augmented reality display that overlays a several information points such as images or icons or multimedia images, over the images or video stream captured by the image capture device. Step 506 comprises presenting the augmented reality display to the user on the user device.

Step 508 comprises scanning the one or more images or each frame of the video stream. Step 510 comprises applying a feature detection protocol to each image or each frame of the video stream to identify a plurality of features. Step 512 comprises processing the identified features to determine an object. Step 514 further comprises comparing the identified features with an object database 221 to identify a specific object based on the identified features (i.e. looking up the object database with the identified features to determine an object). Step 516 comprises checking the risk processing unit 222 or a risk database to identify known risks associated with the detected object. The known risks may be stored as a list and risks are associated with the specific objects. The list of risks may be regularly updated. Alternatively step 516 may comprise checking a risk practitioner device 122 to identify known risks associated with the detected object. Step 518 comprises displaying the one or more risks associated with the detected object on the augmented reality display of the user device. The risks associated with each object is presented to the user. Optionally the method comprises the additional step of categorizing the identified risks based on severity. The risks associated with each object may be classified based on the severity of the risk.

Step 520 comprises generating one or more icons or multimedia images. Step 522 comprises positioning the one or more icons or multimedia images onto the augmented reality display, such that the one or more icons or multimedia images are overlaid onto the image or video stream. The one or more icons or multimedia images are presented to the user on the user interface 306. Each icon or multimedia image corresponds to and represents each identified risk. Preferably each identified risk is represented as an icon or multimedia image. Each icon or multimedia image is interactable by a user as it is presented to the user ono the user interface 306. Step 524 comprises presenting an option to remove the icon or multimedia image, wherein the option is presented adjacent the risk on the augmented reality display. The option is selectable by the user. Step 526 comprises presenting the list of one or more services to address the identified risk when the option is interacted with by the user, the services being presented on the augmented reality display. Step 528 comprises receiving a selection of one or more services by the user. Step 530 comprises transmitting the selected services to the insurance service provider device 120 that is associated with the selected services. The insurance provider can then organize a purchase of the selected services by the user.

Payment for the selected services may be debited from a credit card linked to the user or may debited from one or more tokens that may be earned or purchased by the user. The payment is an online payment using a suitable online payment protocol or online payment method. The method 500 may be repeated constantly or at predefined time periods.

The method 500 may be presented to a user as an interactive game. The method may function as a mobile game that is playable by a user. The augmented reality display allows game information to be presented to the user on the user device 102, 104. Each risk is presented as a gaming character. Each icon or multimedia image is a gaming character. Each of the options to remove the gaming character (as per step 524) may be presented as a list of another icon such as a "weapon". The list of insurance services may be presented as a series of weapons to get address each risk.

Figure 6:
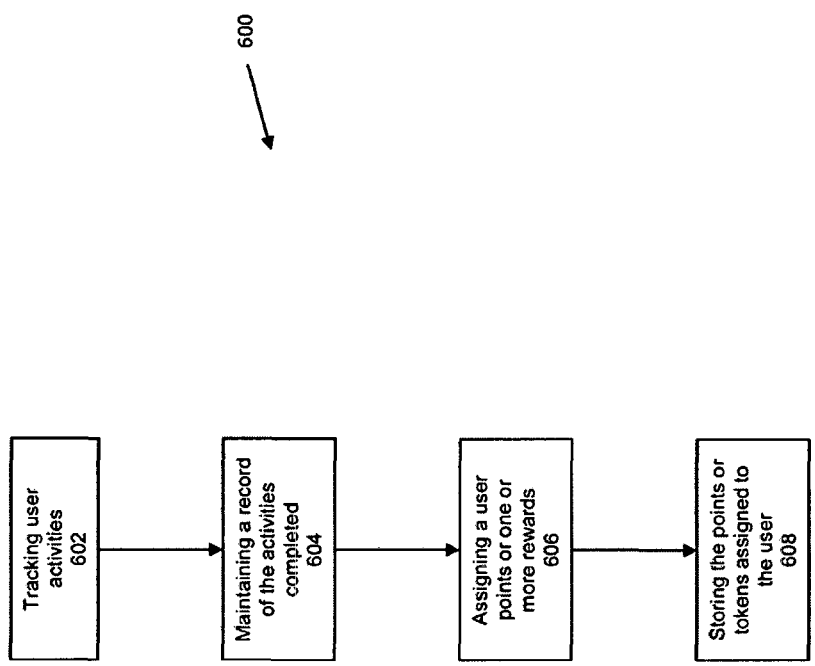
FIG. 6 shows a flow chart of another method for providing insurance services to a user device.

FIG. 6 shows additional optional steps that form a method of scoring within the interactive game to provide insurance services. The method steps shown in FIG. 6 may be part of method 500. The scoring method 600 comprises step 602. Step 602 comprises the step of tracking user activities. Step 604 comprises maintaining a record of the activities completed by the user. The record may be stored in the user database 240 as part of the user profile. The activities may be any predefined activities that can result in points or rewards for the user completing the activities. The types of activities and the points or rewards associated with each activity are predefined for the game. The points and rewards may be changed or updated. Similarly, the particular activities can be changed or updated. The activities may be for example travel to specific locations or travel to a specific location at a specified time. In one example the activities may include visiting insurance seminars at a specified time or a specified location.

Step 606 comprises assigning a user with points or one or more rewards e.g. one or more tokens based on the activities completed by the user, wherein a predetermined amount of points or tokens is assigned to the user. Step 608 comprises storing the points or tokens assigned to the user. The points or rewards (e.g. tokens) are stored in the user database 240 and associated with the user profile of each user. The points or tokens are useable within the interactive game to provide insurance services. In one example the rewards or points can be used in accessing new insurance services or may allow a user to purchase one or more different types of "weapons" i.e. types of insurance services. In a further example the tokens or points may function as currency in the interactive game but may also be related to real money i.e. cash that is spendable. Performing various activities can yield tokens or points to the user, which can in turn may be spent by the user to purchase insurance services, without needing to spend money.

The method steps of method 500 and 600 are implemented using the system components. The various system components of system 100 may include software applications or software programs that include appropriate instructions that cause the system and its components to function as per the described method. The illustrated system architecture is one example architecture. Alternative architectures that perform the same function as also contemplated.

FIGS. 7 to 12 illustrate one example implementation of a method of providing services to a user, in particular for providing insurance services to a user. The method as described with reference to FIGS. 7 to 12 is implemented using the system 100 and its components.

Figure 7:
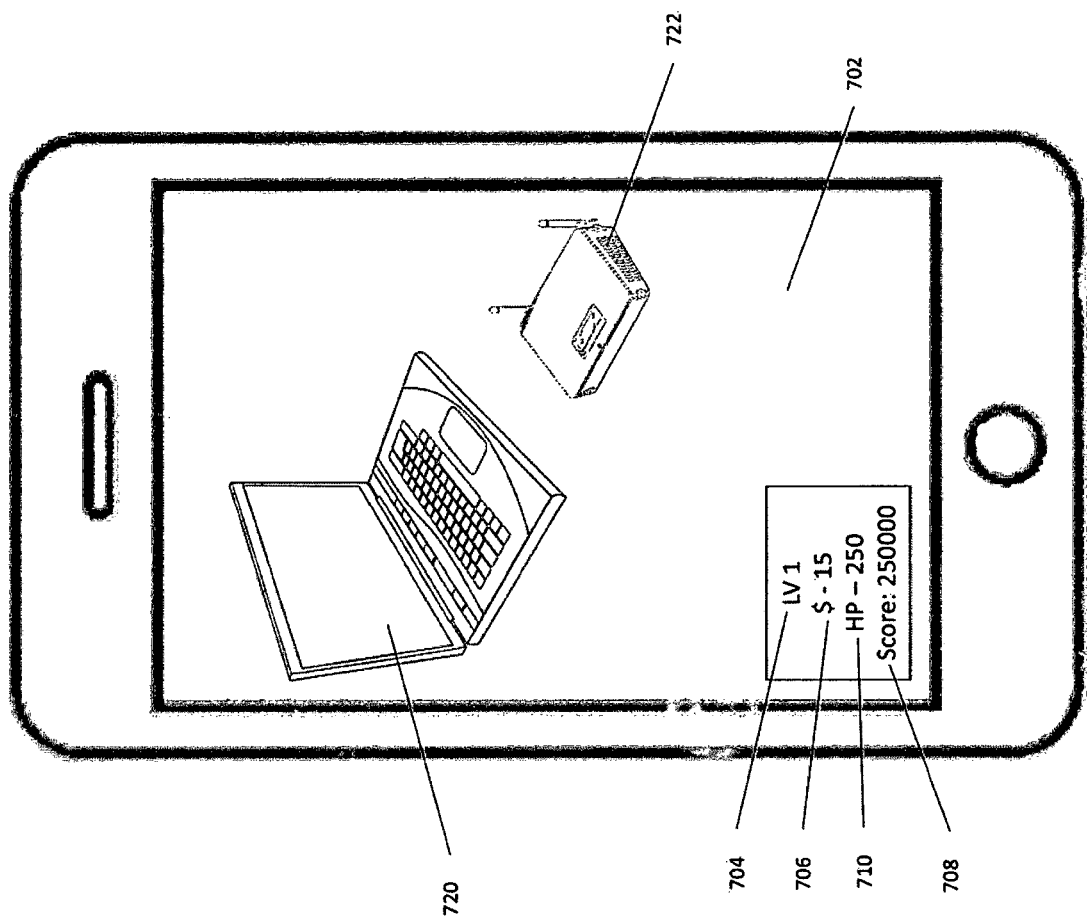
FIGS. 7 to 12 show an interactive game that is used to supply insurance services to a user.

The method of providing insurance services as per FIGS. 7 to 12 are related to providing contents insurance or home insurance with a focus on cyber security. FIGS. 7 to 12 show an interactive game that is used to supply insurance services to a user. As shown in FIG. 7, the method comprises presenting an augmented reality display that is overlaid onto the view of the environment. The augmented reality display 702 is generated by receiving a plurality of images or a video stream of an environment from a camera of a user device (e.g. a smartphone). An augmented reality module is configured to generated an augmented reality view and transmit augmented reality information to the user device. The augmented reality display is overlaid onto the images or video stream captured by the camera.

As shown in FIG. 7 the augmented reality display illustrates the specific objects that are identified within the environment. The one or more objects may be identified by scanning each of the images or video stream, applying a feature detection protocol to each image or each frame of the video stream to identify a plurality of features and process the identified features to determine an object within the environment. The detected objects are displayed on the augmented reality display. Multiple objects within an environment may be identified and presented on the augmented reality display. As shown in FIG. 7 a LENOVO X354 laptop 720 and a BUFFALO A-321 router 722. The objects are identified using a feature identification protocol. FIG. 7 also shows a gaming interface 702. The gaming interface 702 includes a current level 704 of the user character, tokens accrued 706 by the user, points accumulated 708. Optionally the game may include a user (or user character) having life points e.g. hit points 710.

Figure 8:
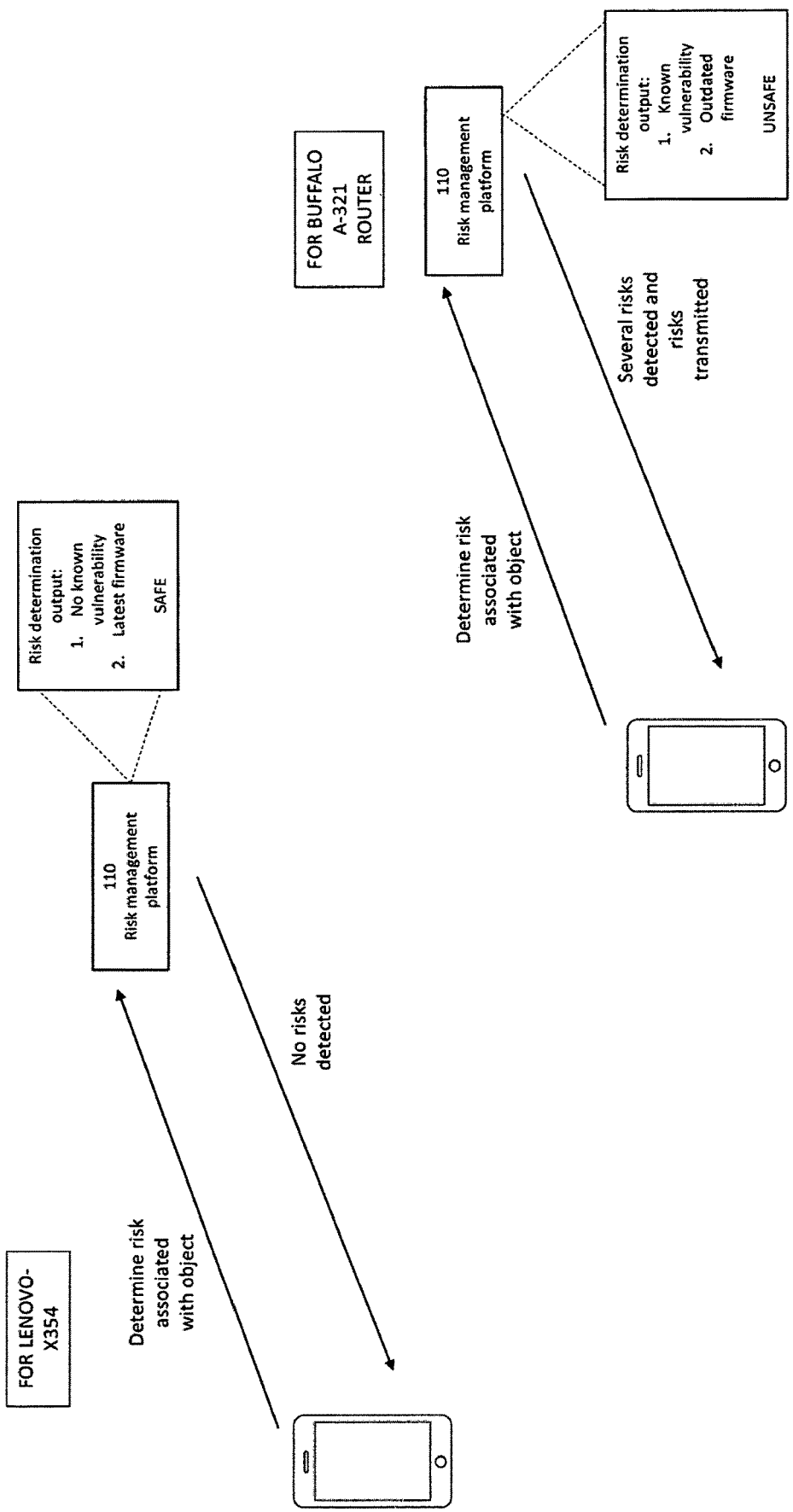

FIG. 8 illustrates that is processing in the background i.e. at the backend of the system. The objects are identified within the environment and determining one or more risks associated with the one or more identified objects. As shown in FIG. 8 the platform 110 (or alternatively the user device 102) and determines any risks associated with the LENOVO X354 laptop. The LENOVO laptop has the latest firmware and no known vulnerability. The risks associated with the LENOVO X354 laptop 720 may be determined by checking the risk processing unit or risk database. In one example the risk processing unit may check a risk database or one or more standards databases such as for example IEEE database or GSI database or Global Standards database. The platform 110 (or the user device) determines the LENOVO X354 laptop 720 as being a safe (i.e. no risks associated with the laptop). The risks associated with the BUFFALO A-321 router 722 may be determined by checking the risk processing unit or risk database. The BUFFLAO A-321 router 722 is identified to having a known vulnerability, which in this case is outdated firmware. New firmware is available. The router is identified as an at-risk object (i.e. device).

Figure 9:
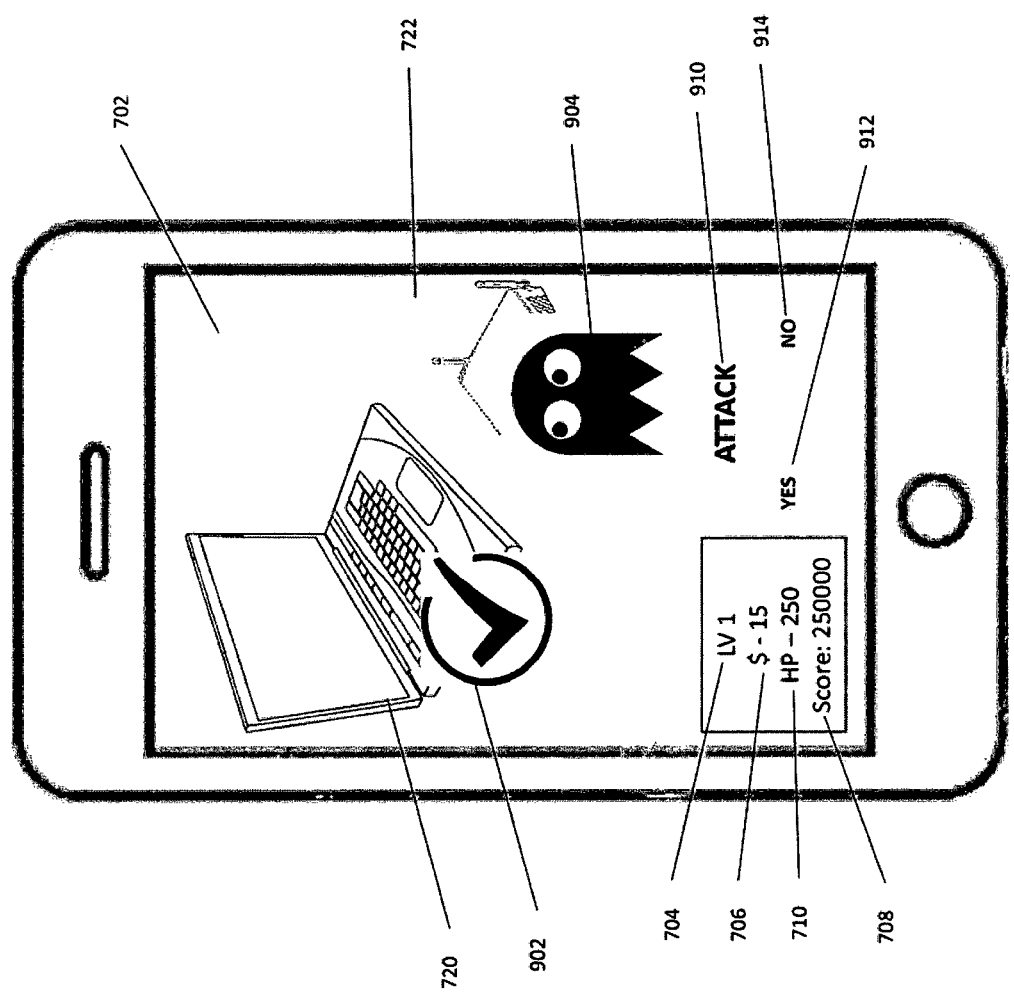

FIG. 9 shows an augmented reality display that is configured to present the risks and safe objects. As shown in FIG. 9, the LENOVO laptop is illustrated as safe with a tick icon 902 presented on the augmented reality display. A character (or icon) 904 is generated and positioned on the augmented reality display. The character 904 is a virus character that denotes a risk (i.e. an at risk object). The virus character is positioned adjacent the ROUTER 722. In one form multiple characters may be presented wherein each character corresponds to a new risk. Alternatively, other characters or icons or multimedia images may be used to represent a risk. An option to attack the virus or risk 910 is presented on the augmented reality display. A user can select YES 912 or NO 914. The augmented reality display is advantageous because it turns an intangible risk into a tangible risk that users can comprehend.

Figure 10:
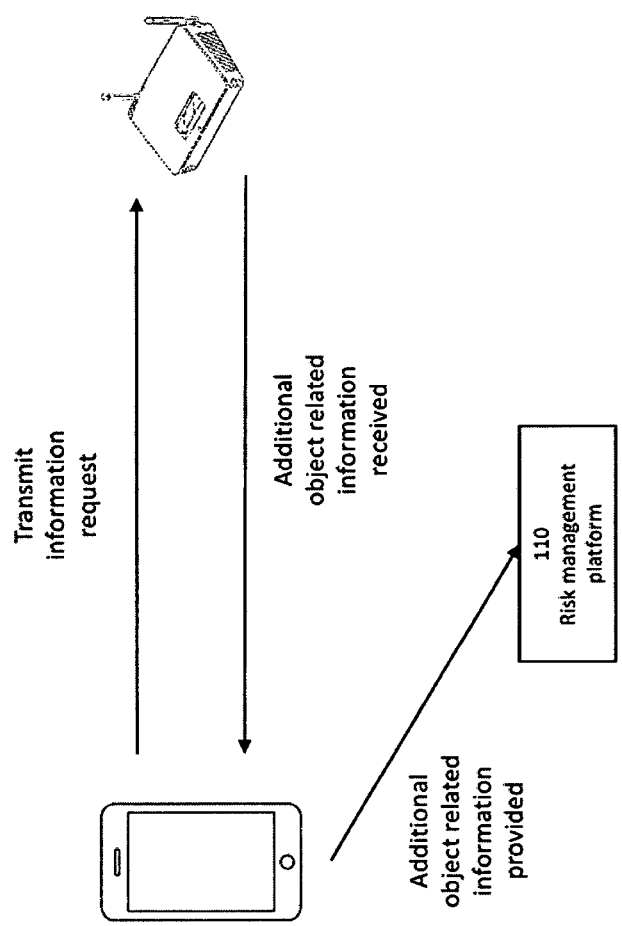

FIG. 10 shows process steps that occur in the background. The system 100 may be configured to establish machine to machine connection between the user mobile device and one or more of the identified objects. In another form the platform 110 may be configured to establish machine to machine connection with the identified objects and the user device. The user mobile device and/or the platform 110 may be configured to communicate with the risk objects in order to obtain more information about the at risk objects. The at-risk object may be equipped with network connectivity technology, e.g. a communication module. The communication module allows connection with a wireless network e.g. the internet or WAN or WiFi or any other wireless protocol. The communication module may comprise IoT hardware that allows communication. The additional object related information is transmitted to the risk management platform 110, as shown in FIG. 10.

Alternatively, the user device 102, 104 may communicate with the risk management platform 110 to receive additional information related to an object. The additional information may be gathered from the object database. The additional information may be used to determine one or more services to address the identified risks.

Further if a user selects to attack the virus, the platform 110 or the user device is configured to determine one or more services to address the identified risks. The one or more services to address the identified risks may be identified by the service provision module. The identified services may be identified based on the type of risk identified. The service provision module may be configured to communicate with the one or more insurance service providers in order to gather services that would address or mitigate the risks. The illustrated processes in FIG. 10 are performed in the background and not presented to the user.

Figure 11:
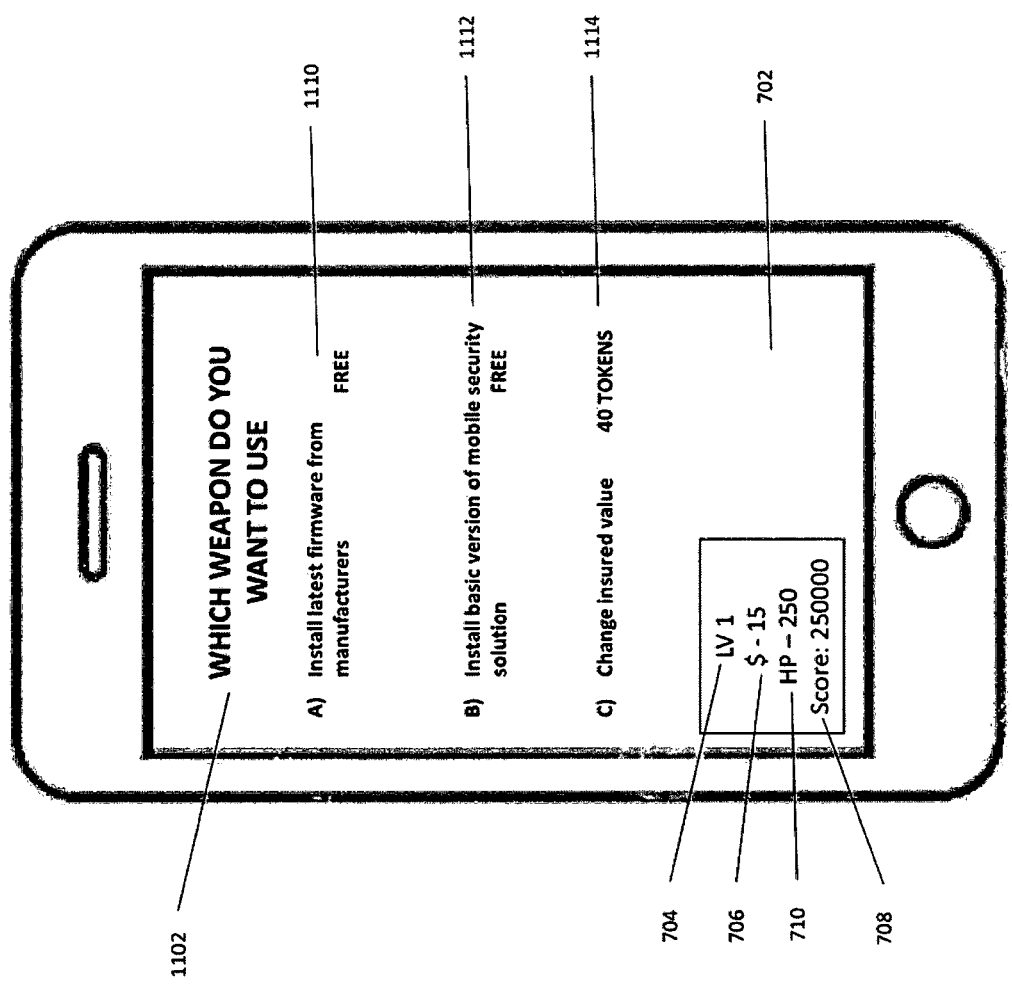

FIG. 11 shows an example view of the user interface that includes the augmented reality display overlaid on the interface. As part of the interactive game one or more options to attack the risk (i.e. virus) are presented. The one or more attack options are presented in a list of options 1102. The list of options includes the services that address the one or more risks. Optionally as part of the interactive game, each option may be presented as a separate icon. For example, each option may be represented by a unique weapon icon e.g. a broadsword, a handgun, a sabre, a grenade etc. The icon representing each service may indicate the effectiveness of the service at mitigating the risk. For example, more effective solutions may be represented by a larger weapon. The presented options are also indicated with the price of the option. As shown in FIG. 11, the first two options i.e. services 1110, 1112 are free and the third option i.e. service 1114 has a cost of 40 tokens. The user can purchase a service if the user has enough tokens.

Figure 12:
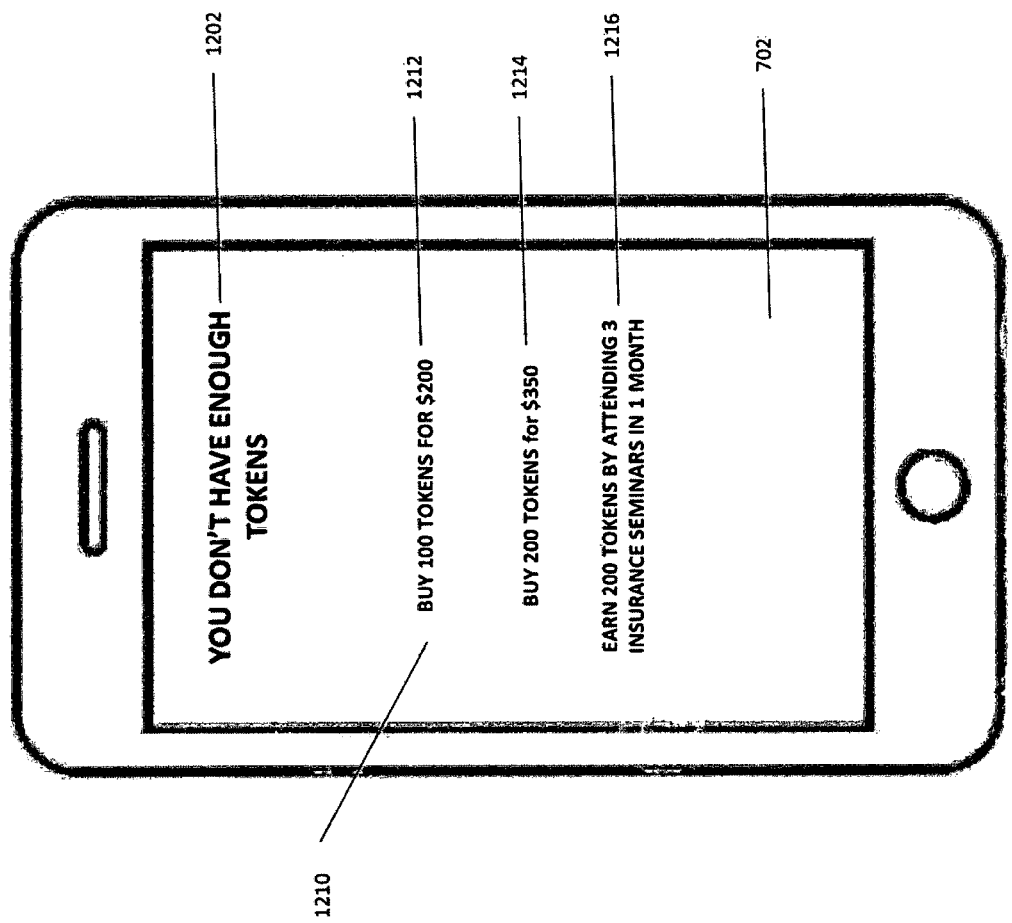

FIG. 12 shows a screen that is presented to the user does not have enough tokens to purchase a selected service. As shown in FIG. 12 a message 1202 regarding the lack of tokens. The message 1202 specifies "you don't have enough tokens. Another 25 tokens are needed". The user can be presented with options to purchase additional tokens. A list of choices 1210 to purchase additional tokens can be presented as selectable choices. A first choice 1212 is to buy 100 tokens for $200, and a second choice 1214 is to buy 200 tokens for $350. These choices are selectable by the user. The user may also be presented with the option to earn tokens by performing one or more predefined activities e.g. attending insurance seminars. The user location can be tracked using a user device e.g. a GPS receiver of the user device. The user can accumulate multiple tokens based on the various activities performed by the user. The user may also be provided an option to earn tokens by connecting to social media or by sharing predefined information across social media platforms. In the illustrated example a third option 1216 is presented to earn 200 tokens by attending 3 insurance seminars in 1 month in Hong Kong.

FIGS. 13 to 18 illustrate a method of providing insurance services via a user device. FIGS. 13 to 18 illustrate a method of providing business insurance to a user. The business insurance is provided as part of an interactive game.

Figure 13:
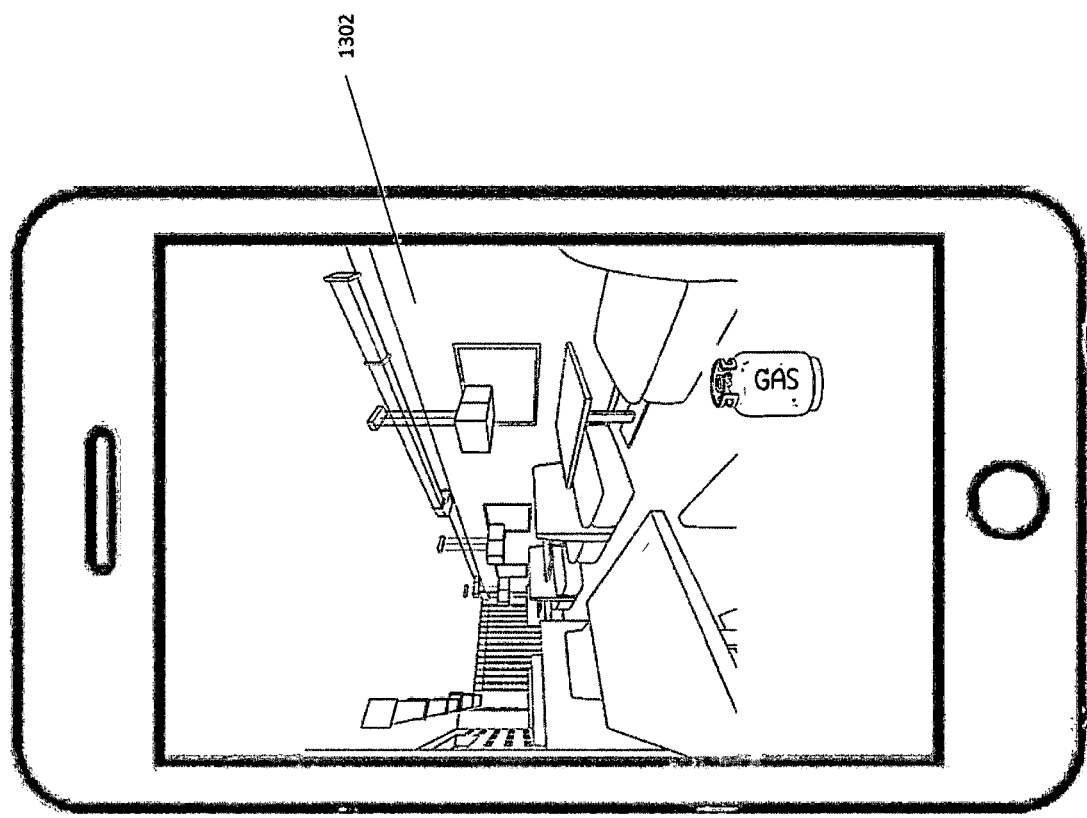
FIGS. 13 to 18 illustrate another example implementation of a method of providing insurance services via a user device.

FIG. 13 shows a user device with an augmented reality display presented on a user interface of the user device. The augmented reality display displays a plurality of objects within an environment. The environment is scanned using an image capture device of the user device. The augmented reality display is overlaid onto the captured images. One or more risks associated with each of the identified objects are determined. The risks are may be determined by the interaction between the user device and the risk processing unit, the risk processing unit being configured to determine risks associated with the identified objects. The environment in FIG. 13 is a restaurant 1302, and the user may be the restaurant owner.

Figure 14:
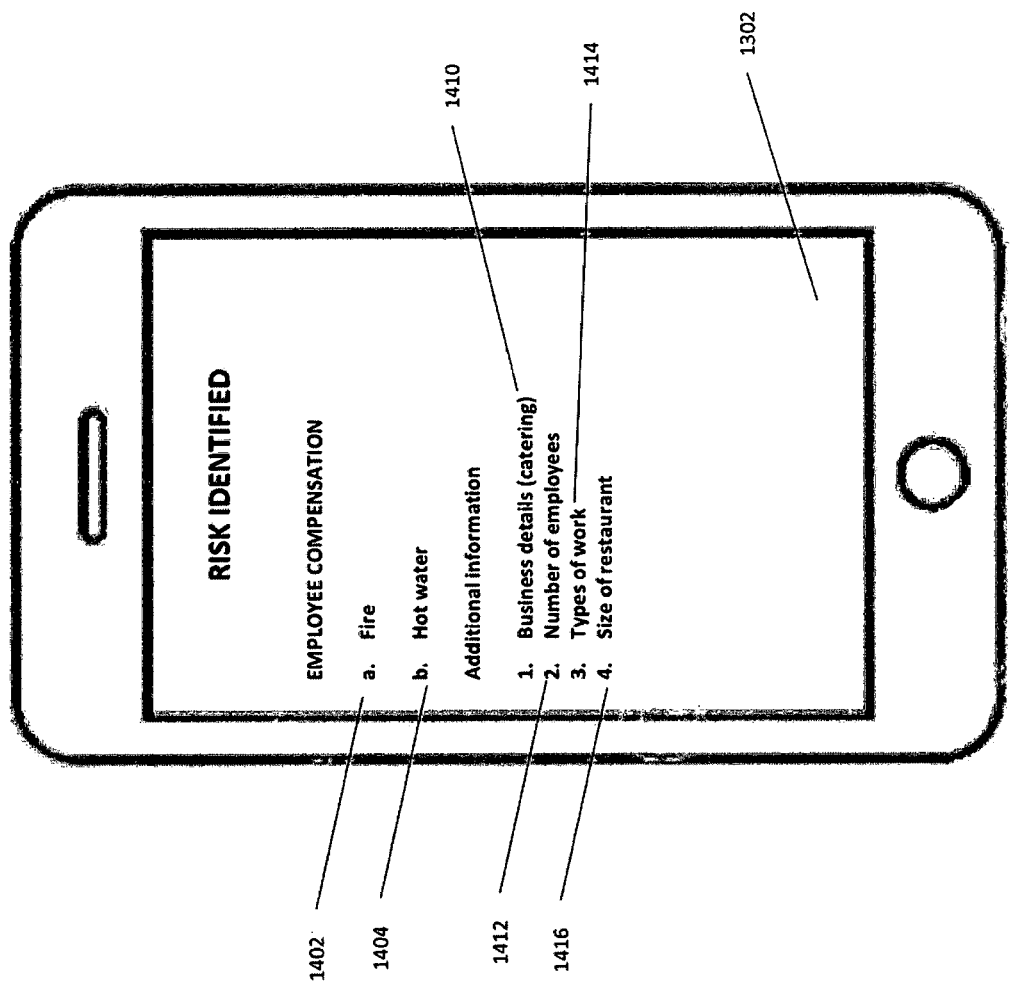

FIG. 14 shows an example display of the identified risks. In the illustrated example the risks are business risks associated with the environment. As shown in FIG. 14 multiple categories of risks are identified, three categories being displayed. The three categories are EMPLOYEE COMPENSATION, PUBLIC LIABILITY, PROPERTY. Further one or more risks associated within each category is presented to the user. For example, FIG. 14 shows the risks associated with the EMPLOYEE COMPENSATION risk category are a) fire 1402, b) hot water 1404 and so on. Additional information related to employee compensation may also be displayed e.g. categories of business catering 1410, number of employees 1412, types of work 1414, size of restaurant 1416. The additional information may be accessed by selecting one of the categories 1410-1416.

Figure 15:
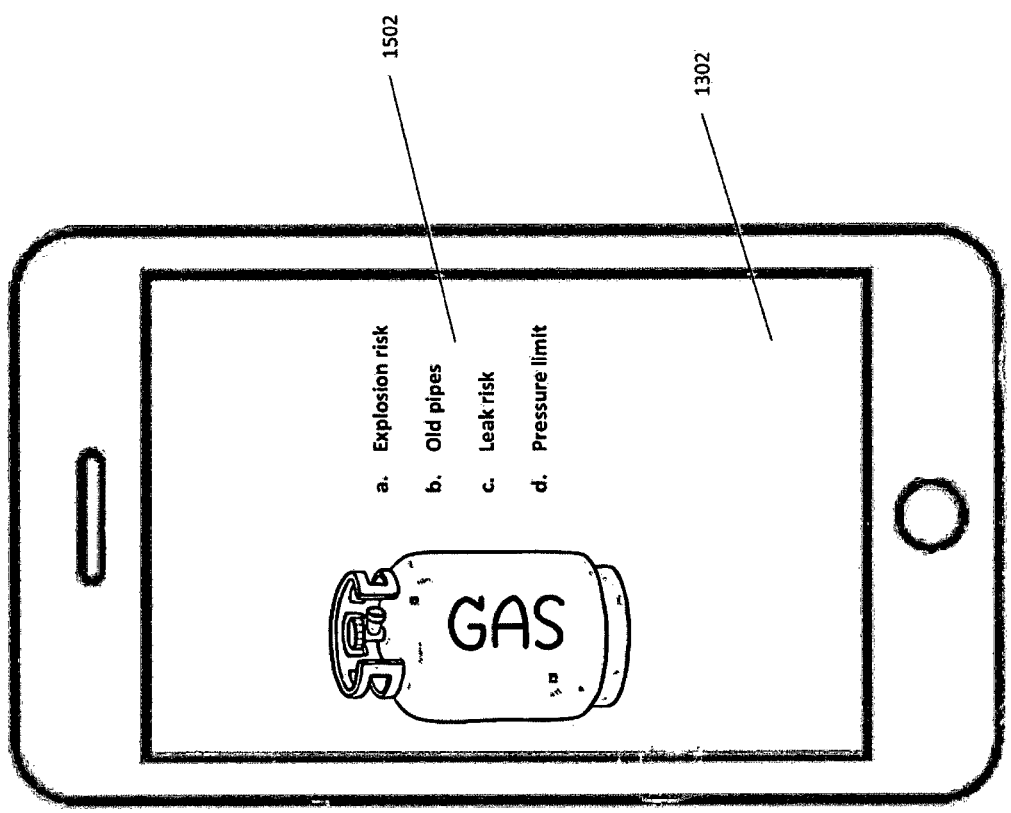

FIG. 15 shows details of various objects identified within the environment and a detailed breakdown of each object and risks associated with each object. As shown in FIG. 15 the gas bottle is identified in the text bubble 1502. The text bubble 1502 also includes risks associated with the identified gas bottle, e.g. explosion risk, old pipes etc. Additional information related to the gas bottle may be included e.g. manufacturer information etc.

Figure 16:
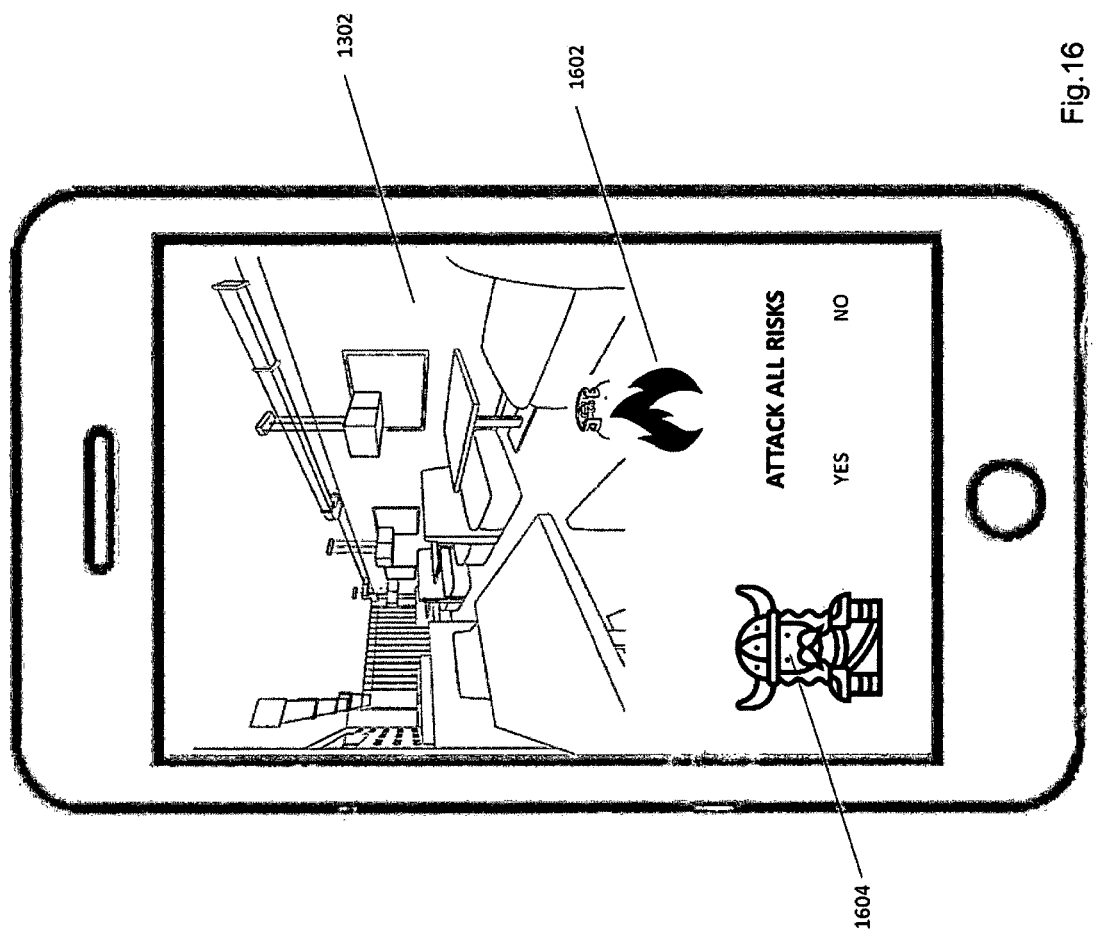

FIG. 16 shows an interactive game that is displayed on the augmented reality display and presented to the user. The at risk object e.g. the gas bottle is represented by an icon or multimedia image 1602. In illustrated example the icon 1602 is a fire. A further character 1604 is presented to the user with an option to get rid of all risks associated with an object. The character may be a user selected character or a predefined character. An option to attack all risks is also presented to the user. The user may be able to control the character to attack the risks and reduce the risks. The attack may include using insurance services.

Figure 17:
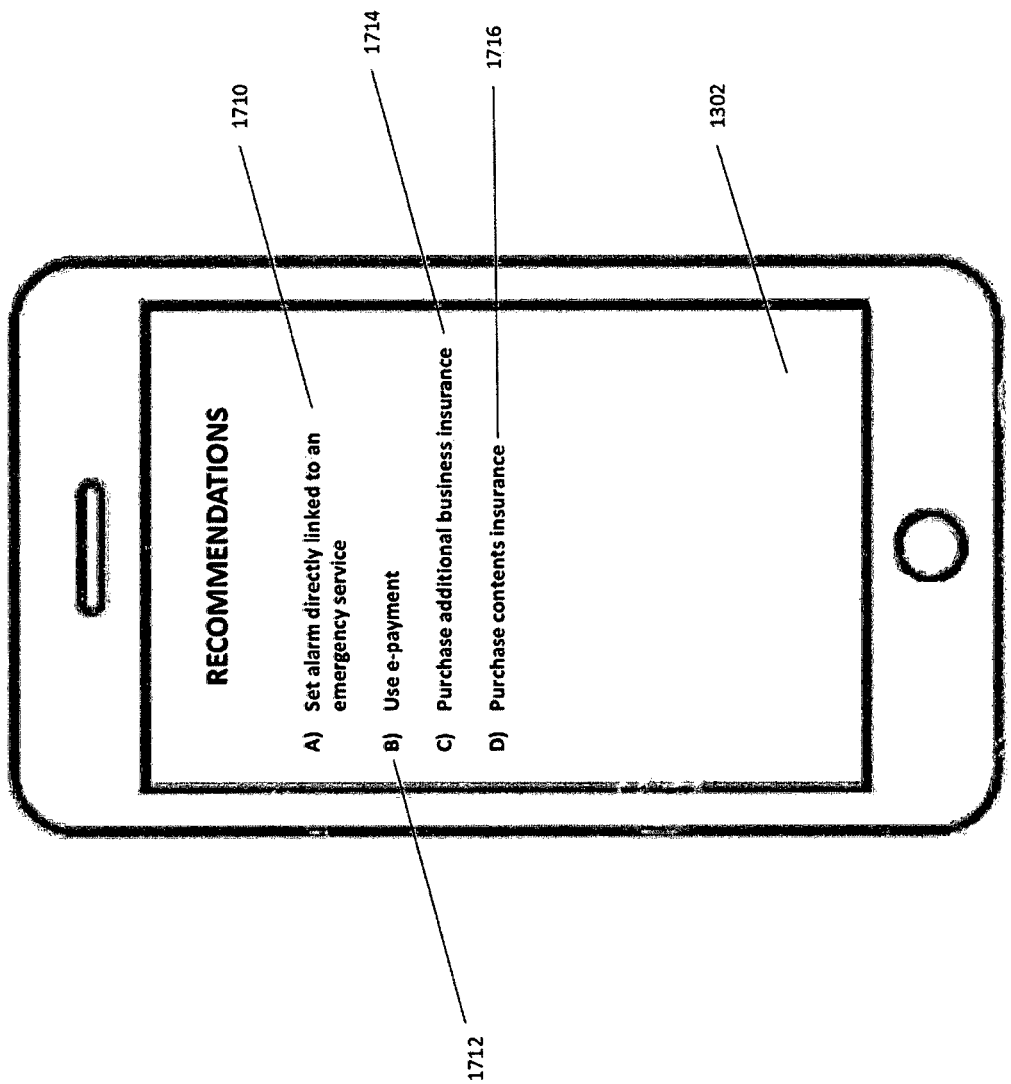

FIG. 17 illustrates one or more services that can be applied to address or mitigate the identified risks associated with the identified objects. As shown in FIG. 17 a selectable option 1702 to purchase insurance services is presented. In the illustrated example one or more recommendations to mitigate the risks may be presented to the user. As shown in FIG. 17 two mitigation recommendations 1710, 1712 are presented to the user. The first recommendation 1710 is a recommendation to connect an alarm directly linked to a police station. The second recommendation 1712 is to use an e-payment option. The recommendations are directed to mitigate business risks. Part of the options presented may also include the options to purchase additional insurance services such as additional business insurance 1714 or contents insurance 1716 or any other insurance services. The platform 110 is configured to facilitate purchase of the selected insurance services or execute the selected option. The services can be purchased via the user device and the augmented reality display 1302.

Figure 18:
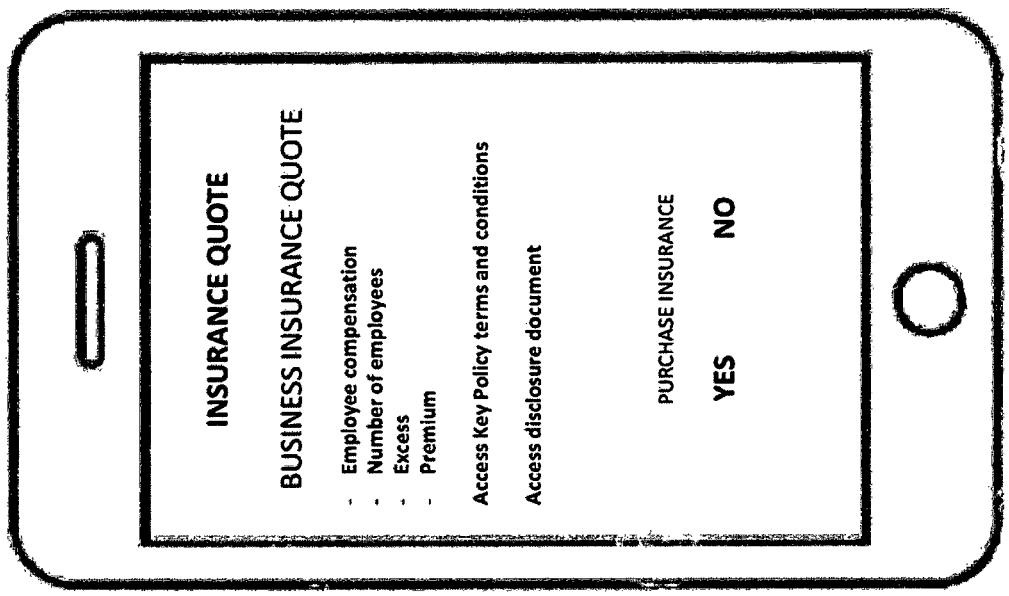

FIG. 18 illustrates an insurance quote for business insurance. The quote may be auto populated based on the information gathered by the user device. The information may be related to one or more of the various objects, business details, risks related to a business and/or objects. The user can directly purchase the insurance service. The user can purchase insurance services online, wherein the insurance services may be tailored or customized to the specific business, contents, objects and/or identified risks. The quote as displayed in FIG. 18 may include policy details, premium, excess and other similar information. Further there may be an option to access terms and conditions and/or access a product disclosure statement. An option to purchase insurance is presented to the user on the augmented reality display. If the user selects YES, the platform 110 is configured to facilitate purchase of the selected insurance service.

The interactive game as described herein can be any game. In some example configurations the user may be able to select and play multiple types of games, such as for example a role play game, a shooting game, a racing game or any suitable game. Multiple types of games allow multiple users to interests to be catered for and allows the system to reach multiple users.

A further example of a method of providing insurance services to a user will be described. A user may download an application from an app store e.g. the Apple app store. The app allows the user device to connect with the platform 110 and function as a client. The app may include further software modules that allow the user device to perform various functions. The user initially is prompted to create a user profile that includes age, username, country, password etc. The user will register an email address and also register a credit card for payments. The email or user name will be used by the user to sign in. The user profile can be edited by the user e.g. the user can edit privacy settings, social settings, game settings, include a self picture, edit marketing preferences etc.

Following creating of a profile the user is presented with a training program via an augmented reality display on the user device. The user can select an interactive game to play.

The training program (i.e. trainer) can provide one or more of the following selectable options: online shopping, checking for new items, browsing the internet e.g. web stores, social media etc. to earn rewards or points, watch videos, or modify a selected game character. The training program may be presented the first time a user selects the game. The trainer can be accessed by a user at any time during use.

As part of the game the user selects a game and selects a character. The character can be customized by the user. The game commences with scanning the environment and capturing images or a video stream of the environment via the user device. An augmented reality display is generated and overlaid onto the environment. Information can be presented to the user via the augmented reality display and the information is overlaid over the current environment such that the information can appear as part of the environment. Various objects can be identified in the environment. Some objects may have points or rewards associated with them, which the user can access by clicking on them. The identified objects in the environment can be registered in a risk database. Risks associated with the one or more identified objects. The risks may be displayed as an overlay onto the environment and the object via an augmented reality display. One or more services e.g. insurance services that can mitigate the identified risks can be presented on the augmented reality device. The risks may be presented as icons or characters.

The user can move the user character around the screen i.e. around the augmented reality display. Alternatively the user is forced to move which causes the user character to move. The user can select a command to attack a risk (or a icon or character representing the risk). The command may be a tactile input or a voice command. The risk may be represented as a monster or a villain type character. The user can select a weapon for the user character. The weapon may be selected based on the weapon abilities. Each weapon may relate to a specific insurance service or a customized insurance service. New weapons can be unlocked or purchased. The user attacks the risk with the weapon which can translate to a purchase of the selected insurance services. The character and/or weapons associated with each character can be upgraded throughout the game. Tokens or reward points can also be collected by the user by purchasing them or by completing specified tasks such as for example attending seminars or vising specific locations etc. The game may be finished by the user at any time and the game or games are designed such that they can continue perpetually such that insurance risks are constantly identified and insurance services are constantly presented to the user.

The present disclosure is written with reference to insurance services being provided to the user. It should be understood that the system and method described herein may be configured to provide other different services such as security services, software upgrades or any other services. The disclosed system and method is advantageous because it utilizes augmented reality as a way to improve engagement between customers and businesses. The use of augmented reality also allows real time provision of information in a simple interface. The disclosed system and method for providing insurance services improves the process of recommending insurance services and purchasing insurance services. The use of an augmented reality display allows additional data sources to be available which enables better tailored risk calculations. The additional data points are gathered due to the object detection that can be performed based on the capture of images of an environment. Improved risk calculations is advantageous since tailored insurance services can be recommended to a user for risk mitigation. The use of augmented reality display provides improved visualization of the recommended insurance services and provides improved context for each user. The improved context allows a user to better understand the coverage being provided and the objects being covered since the risks associated with objects in an environment The disclosed system and method is also advantageous since the system leverages augmented reality and in some instances connectivity (i.e. IoT technology) to provide additional risk insights to insurers and risk providers by identifying objects and vulnerabilities regarding each detected object. The system and its components allow for a new and improved way for insurance service providers to interact with users of the system (i.e. customers). The system can also allow for insurance service providers to provide customized or tailored pricing. The system allows for dynamic pricing by insurance service providers. Implementing the method of providing insurance services as an interactive game improves engagement between users and insurance providers. Using an interactive game format and augmented reality can also improve education of a user with respect to risks associated with objects in their environment since information can be overlaid on an image or video stream captured by the user mobile device.

Methods and processes described herein may be embodied in, and partially or fully automated via, software code modules executed by one or more general and/or special purpose computers. The word "module" refers to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). It will be further appreciated that hardware modules may comprise connected logic units, such as gates and flip-flops, and/or may comprised programmable units, such as programmable gate arrays, application specific integrated circuits, and/or processors. The modules described herein can be implemented as software modules, but also may be represented in hardware and/or firmware. Moreover, although in some embodiments a module may be separately compiled, in other embodiments a module may represent a subset of instructions of a separately compiled program, and may not have an interface available to other logical program units.

In certain embodiments, code modules may be implemented and/or stored in any type of computer-readable medium or other computer storage device. In some systems, data (and/or metadata) input to the system, data generated by the system, and/or data used by the system can be stored in any type of computer data repository, such as a relational database and/or flat file system. Any of the systems, methods, and processes described herein may include an interface configured to permit interaction with users, operators, other systems, components, programs, and so forth In the foregoing description reference has been made to elements or integers having known equivalents, then such equivalents are included as if they were individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

It should be emphasized that many variations and modifications may be made to the embodiments described herein, the elements of which are to be understood as being among other acceptable examples. All such modifications and variations are intended to be included herein within the scope of this disclosure and protected by the following claims. Further, nothing in the foregoing disclosure is intended to imply that any particular component, characteristic or process step is necessary or essential.

The invention claimed is:

1. A method for providing it services to one or more users via a user device, the method comprising the steps of:
receiving a plurality of images or a video stream of an environment,
overlaying an augmented reality display over the plurality of images or the video stream,
presenting the augmented reality display to a user on the user device,
identifying one or more risks within the plurality of images or the video stream,
presenting the one or more risks to the user on the augmented reality display,
determining one or more services to address the one or more identified risks,
presenting the one or more services to the user on the augmented reality display, wherein the one or more services being selectable by a user via the augmented reality display.

2. The method for providing insurance services in accordance with claim 1, wherein the one or more risks correspond to an object or a person identified within the one or more images or video stream.

3. The method for providing insurance services in accordance with claim 1, wherein the step of identifying one or more risks comprises the steps of identifying one or more objects within the environment and determining one or more risks associated with the one or more identified objects.

4. The method for providing insurance services in accordance with claim 3, wherein the step of identifying one or more objects within the environment comprises the additional steps of:
scanning each of the one or more images or each frame in the video stream, applying a feature detection protocol to each image or each frame of the video stream to identify a plurality of features, processing the identified features to determine an object.

5. The method for providing insurance services in accordance with claim 4, wherein the step of processing the identified features comprises looking up an object database with the identified features and identifying an object that corresponds to the identified features.

6. The method for providing insurance services in accordance with claim 3, wherein the step of identifying one or more objects comprises;

receiving an object identifier from a device wherein the object identifier being unique to each object, determining an object based on the received object identifier by comparing the identifier with a stored list of identifiers wherein the list stores a relationship between an identifier and a corresponding object.

7. The method for providing insurance services in accordance with claim 6, wherein the method comprises providing an interrogation signal to the electronic device, receiving the object identifier as an electronic signal from the electronic device in response to the interrogation signal.

8. The method for providing insurance services in accordance with claim 3, wherein the step of determining one or more risks comprises the additional steps of checking a risk processing unit or a risk database or a risk practitioner device to identify known risks associated with the detected object.

9. The method for providing insurance services in accordance with claim 8, wherein the one or more risks associated with the detected object is displayed on the augmented reality display, the one or more risks being displayed as a list adjacent the object.

10. The method for providing insurance services in accordance with claim 3, wherein the method comprises the additional step of categorizing the identified risks based on severity.

11. The method for providing insurance services in accordance with claim 10, wherein the risk processing unit or the risk database or the risk practitioner device includes information regarding one or more known risks associated with each object and each risk being classified based on severity of the risk.

12. The method for providing insurance services in accordance with claim wherein the method comprises the additional steps of:

generating one or more icons or multimedia images positioning the one or more icons or multimedia images onto the augmented reality display, such that the one or more icons or multimedia images are overlaid onto the image or video stream, wherein each of the one or more icons or multimedia images corresponding to and representing each identified risk.

13. The method for providing insurance services in accordance with claim 12, wherein each identified risk is represented by an interactable unique icon or multimedia image.

14. A method for providing insurance services in accordance with claim 1, wherein the method comprises presenting an option to remove the icon or multimedia image, the option being presented adjacent the risk on the augmented reality display and the option is selectable by the user.

15. A method for providing insurance services in accordance with claim 14, wherein the method comprises the additional step of presenting the list of one or more services to address the identified risk when the option is interacted with, the services being presented on the augmented reality display.

16. A method for providing insurance services in accordance with claim 1, wherein the one or more services are insurance services or insurance coverage to cover the identified object.

17. A method for providing insurance services in accordance with claim 1, wherein the method comprises the additional steps of:

tracking user activities, maintaining a record of activities completed by the user assigning a user with points or one or more tokens based on the activities completed by the user, wherein a predetermined amount of points or tokens is assigned to the user and;

storing the points or tokens assigned to the user.

18. A method of providing insurance services to one or more users comprising:

receiving one or more images or a video stream of an environment, applying a feature detection protocol to each image or frame of the video stream, thereby providing identified features, processing the identified features to determine an object, identifying one or more risks associated with each object, thereby providing identified risks, transmitting the identified risks such that the identified risks are presented to a user on a user device via an augmented reality display that is implemented on the user device.

19. A method for providing insurance services in accordance with claim 18, wherein the step of processing the identified features comprises looking up an object database with the identified features and identifying an object that corresponds to the identified features.

20. A method for providing insurance services in accordance with claim 18, wherein the step of determining the one or more risks comprises checking a risk database to identify known risks associated with the detected objects.

21. A method for providing insurance services in accordance with claim 18, wherein the one or more risks associated with the detected object is displayed on the augmented reality display.

22. A method for providing insurance services in accordance with claim 18, wherein the method comprises the additional steps of:

generating one or more icons or multimedia images positioning the one or more icons or multimedia images onto the augmented reality display, such that the one or more icons or multimedia images are overlaid onto the image or video stream, wherein each of the one or more icons or multimedia images corresponding to and representing each identified risk such that each risk is represented by an icon or multimedia image on the augmented reality device.

23. A method for providing insurance services in accordance with claim 18, wherein the method comprises the additional steps of:

identifying one or more services to address the identified risks, presenting the one or more services on an augmented reality display such that a user can select one of the one or more services, wherein the services are one or more insurance services each of the insurance services are provided by one or more insurance service providers, receiving a selection of at least of the services, facilitating purchase of the selected service.

24. A method for providing insurance services in accordance with claim 18, wherein the one or more images are received from a user device, wherein the user device includes an image capture device that is configured to capture images or an environment at predetermined intervals.

25. A method for providing insurance services in accordance with claim 21, wherein the method comprises the additional steps of:

tracking user activities, maintaining a record of activities completed by the user assigning a user with points or one or more tokens based on the activities completed by the user, wherein a predetermined amount of points or tokens is assigned to the user and;

storing the points or tokens assigned to the user.

26. An interactive game for providing services to a user, the method comprising the steps of:

presenting one or more selectable user characters on an augmented reality display that is overlaid over an image or video stream of an environment, identifying one or more objects within the environment, identifying one or more risks associated with the identified objects, presenting the identified risks on the augmented reality display wherein each risk is represented as an icon or a multimedia image, presenting one or more options to attack the icon or multimedia image with the user character to remove the risk, assigning a score for each risk that is removed and;

presenting the accumulated score on the augmented reality display.

27. The interactive game for providing services to a user in accordance with claim 26, wherein the one or more options correspond to a selectable insurance service, the insurance service being a service that mitigates the risk.

28. The interactive game for providing services to a user in accordance with claim 26, wherein a user character is moveable on the augmented reality display.

29. The interactive game for providing services to a user in accordance with claim 26, wherein each object is identified by applying a feature detection protocol to each received image or video frame from a user device or an image capture device associated with the user, the detected features being looked up in a look up table or an object database with the identified features to determine an object that correspond.

\* \* \* \* \*